US007396285B2

(12) United States Patent
Weckerling

(10) Patent No.: US 7,396,285 B2
(45) Date of Patent: Jul. 8, 2008

(54) COUNTER TRACK JOINT WITH TRACK TURNING POINT

(75) Inventor: Thomas Weckerling, Bonn (DE)

(73) Assignee: GKN Driveline International GmbH, Lohmar (DE)

( * ) Notice: Subject to any disclaimer, the term of this patent is extended or adjusted under 35 U.S.C. 154(b) by 158 days.

(21) Appl. No.: 10/562,962

(22) PCT Filed: Nov. 2, 2004

(86) PCT No.: PCT/EP2004/012380

§ 371 (c)(1), (2), (4) Date: Dec. 30, 2005

(87) PCT Pub. No.: WO2006/048032

PCT Pub. Date: May 11, 2006

(65) Prior Publication Data

US 2007/0111806 A1 May 17, 2007

(51) Int. Cl.
*F16D 3/224* (2006.01)

(52) U.S. Cl. .................................... 464/145; 464/906

(58) Field of Classification Search ................ 464/140, 464/145, 146, 906
See application file for complete search history.

(56) References Cited

U.S. PATENT DOCUMENTS 6,319,133 B1 * 11/2001 Schwarzler et al. ......... 464/145
6,848,999 B2 2/2005 Weckerling et al.
2001/0006910 A1 * 7/2001 Krude et al. ................ 464/145
2004/0116192 A1 6/2004 Krude et al.
2004/0137991 A1 7/2004 Weckerling
2005/0090317 A1 4/2005 Hassenrik et al.
2006/0154734 A1 7/2006 Hassenrik et al.
2006/0217207 A1 * 9/2006 Hoshino et al. ............. 464/145
2006/0281565 A1 * 12/2006 Schwarzler et al. ......... 464/145

FOREIGN PATENT DOCUMENTS

DE 103 37 612 A1 6/2004

* cited by examiner

*Primary Examiner*—Greg Binda

(57) ABSTRACT

A constant velocity counter track joint (11) having an outer joint part with first outer ball tracks (18) and second outer ball tracks (20), an inner joint part with first inner ball tracks (19) and second inner ball tracks (21). A ball cage (16) is positioned between the outer joint part and the inner joint part with cage windows which each accommodate at least one of the balls. When the joint is in the aligned condition, the aperture angle ($\delta_1$) of the pairs of first tracks opens in the central joint plane (E) from the aperture end to the attaching end of the outer joint part (12), and the aperture angle ($\delta_2$) of the pairs of second tracks opens in the opposite direction. The central track lines ($L_{18}$, $L_{19}$) of the first pairs of tracks each have a turning point ($T_{1-2}$), and the center angle ($\beta$) from the joint center to the turning point ($T_{1-2}$), is greater than 4°.

19 Claims, 20 Drawing Sheets

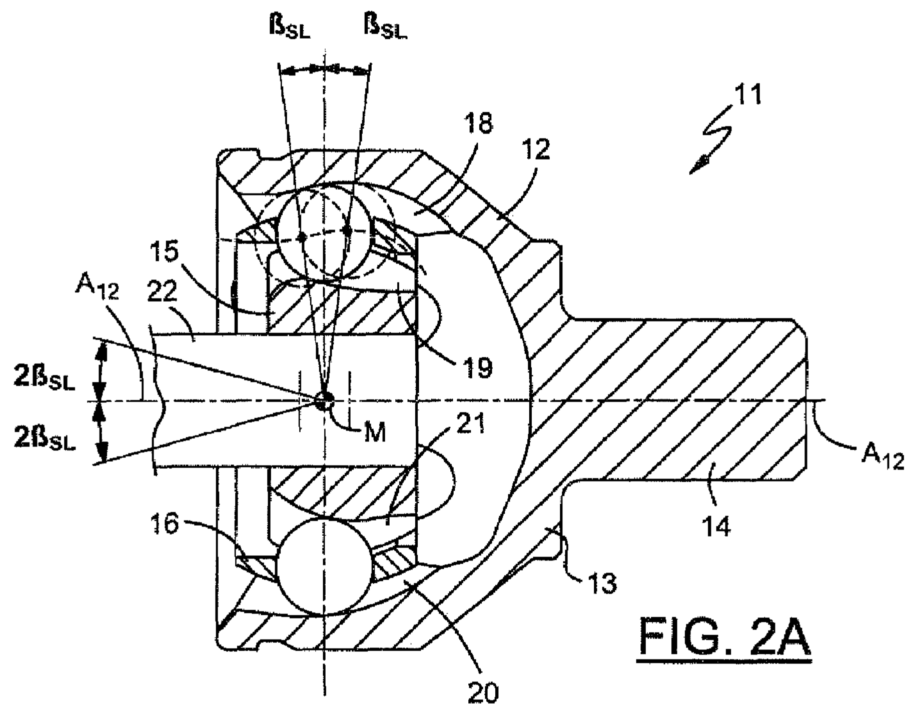
FIG. 2A
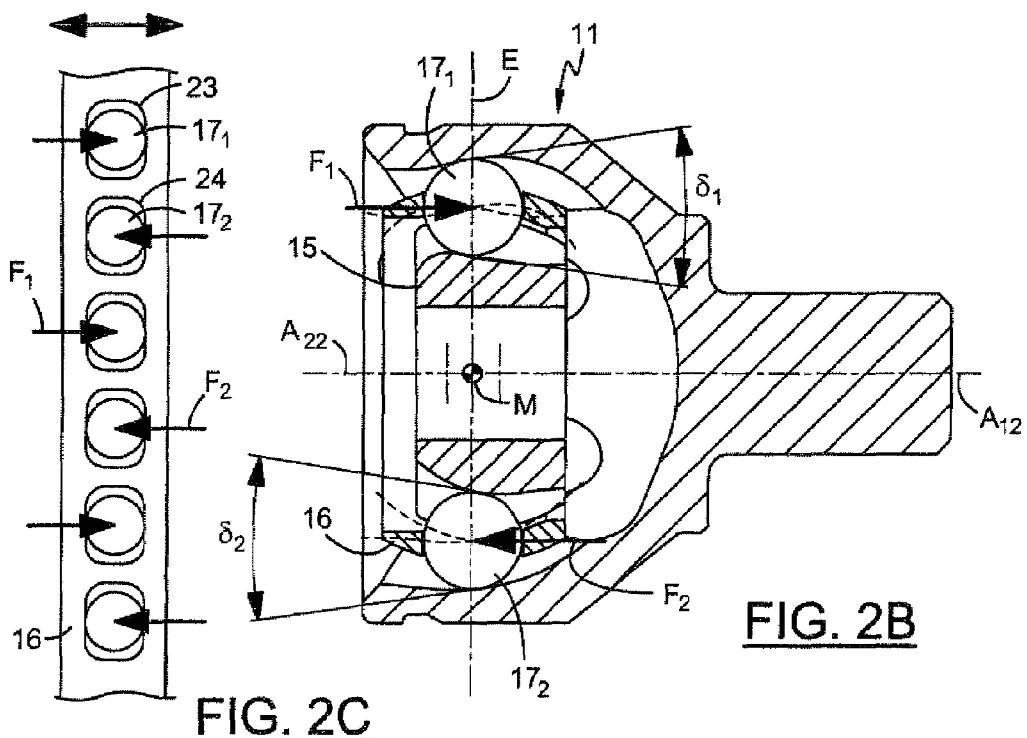
FIG. 2B
FIG. 2C

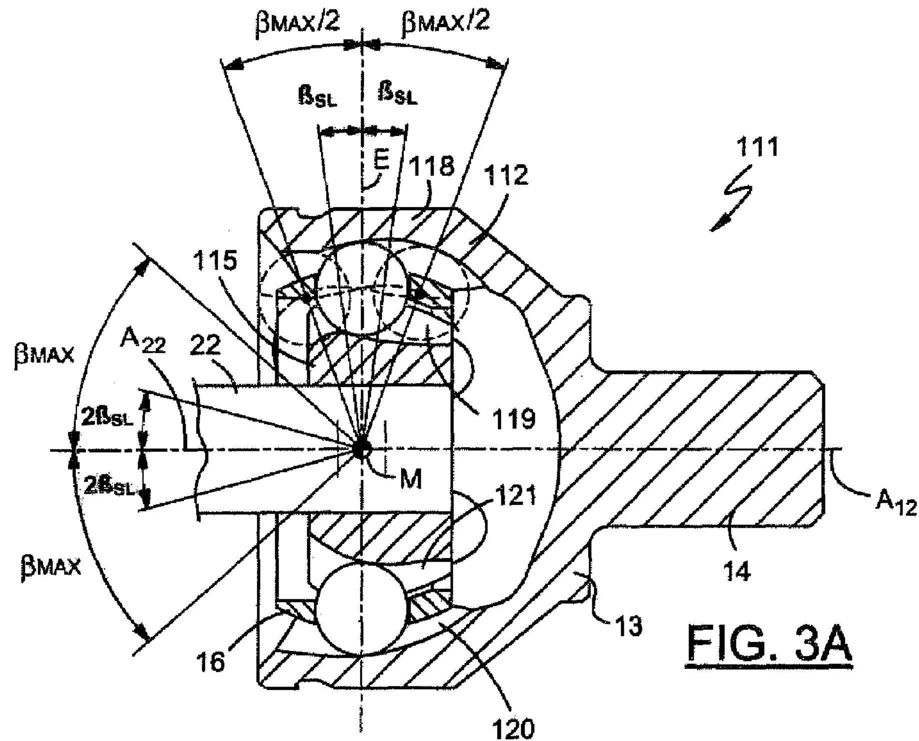
FIG. 3A
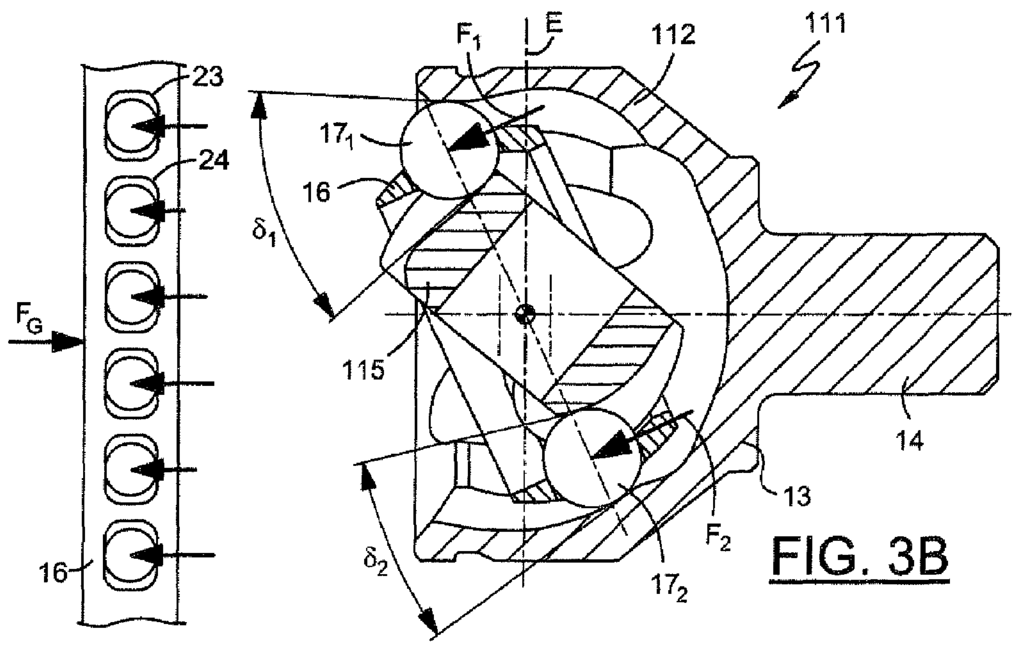
FIG. 3B
FIG. 3C

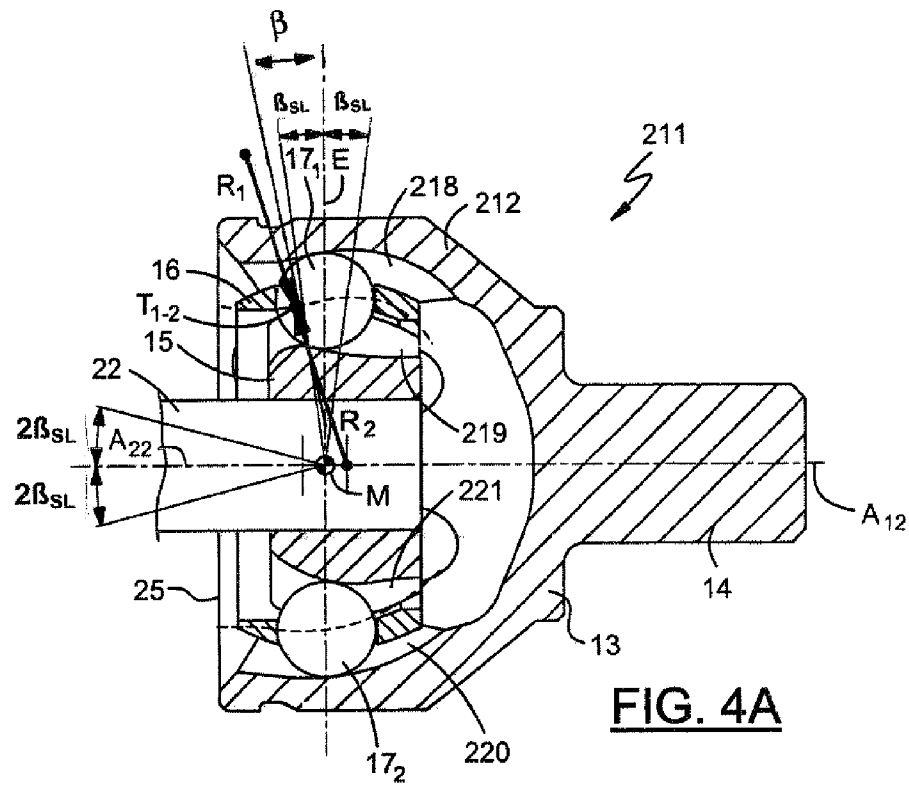
FIG. 4A
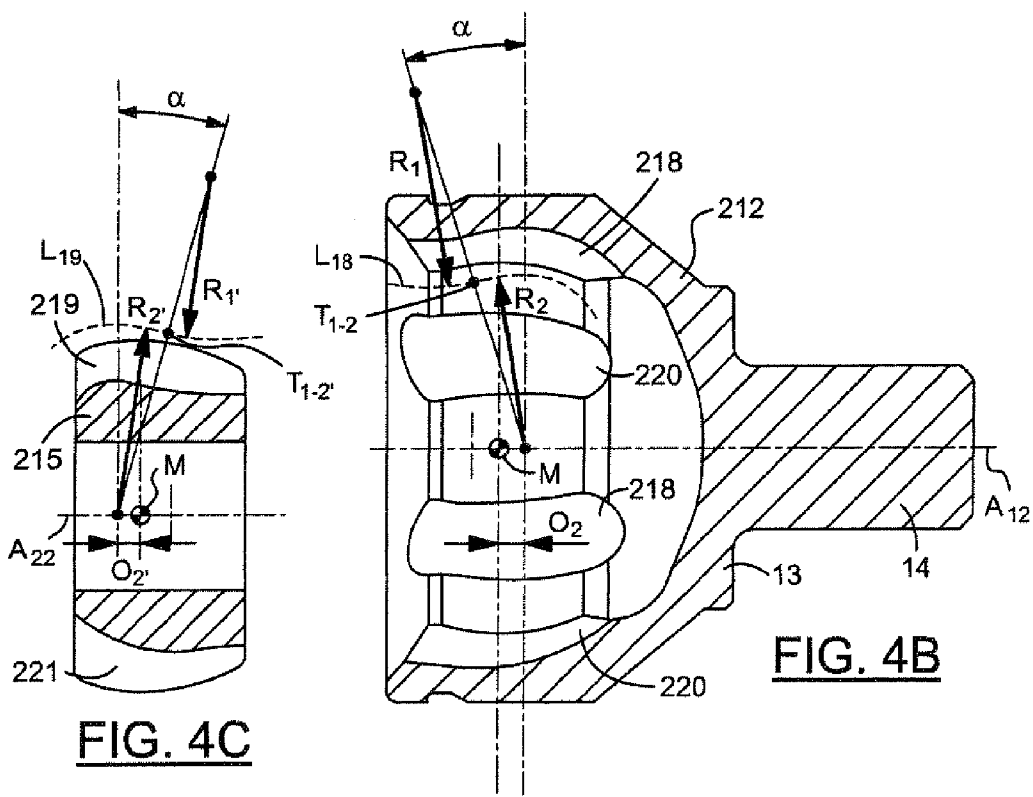
FIG. 4C
FIG. 4B $\alpha \leq 17°$

| α | 10° | 11° | 12° | 13° | 14° | 15° | 16° | 17° | 18° |
|---|---|---|---|---|---|---|---|---|---|
| ε | ++ | ++ | ++ | ++ | ++ | + | + | - | -- |

$$\alpha \geq \beta + \arcsin\left[\frac{O_2 + a \cdot \tan(\beta)}{R_2} \cdot \sin(\beta + 90°)\right]$$

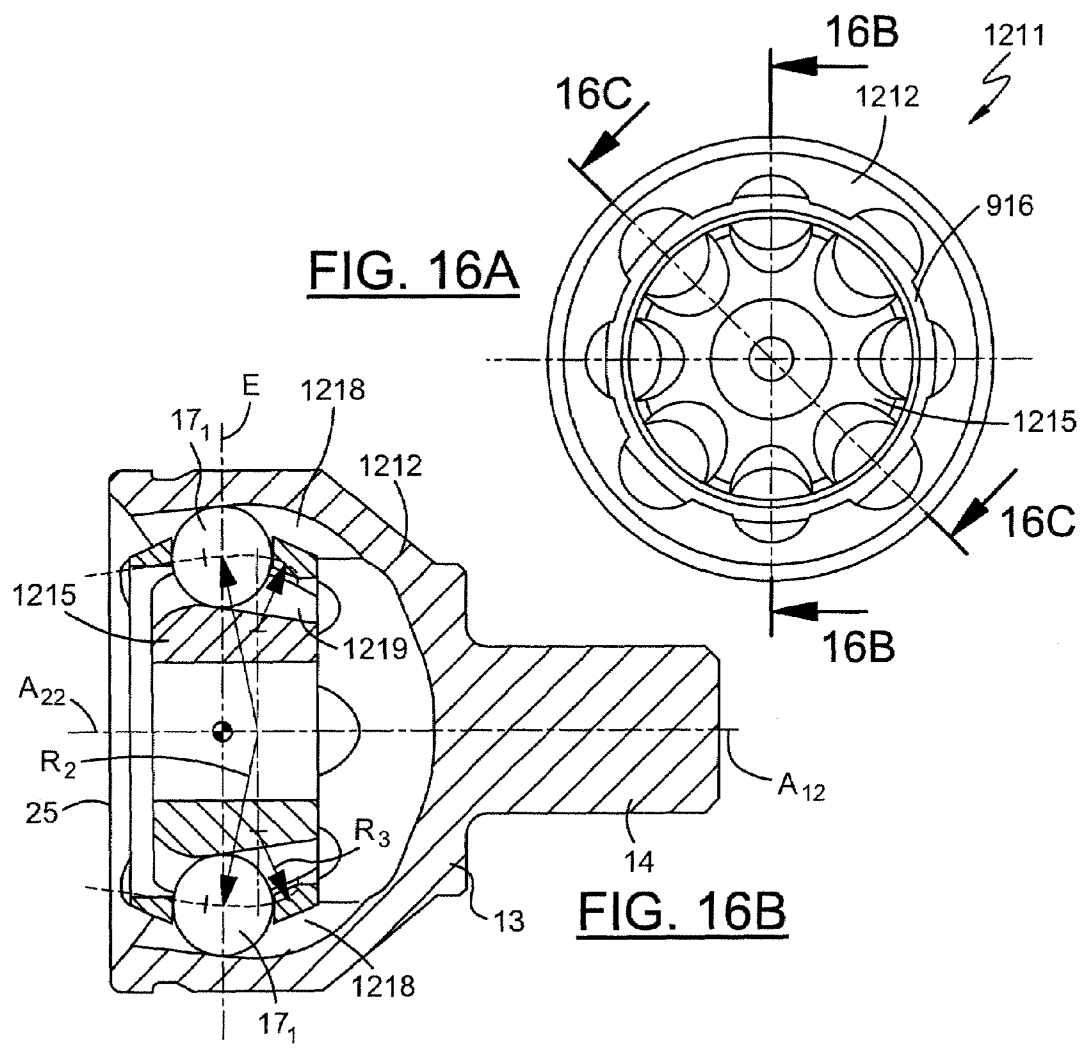
FIG. 16A
FIG. 16B
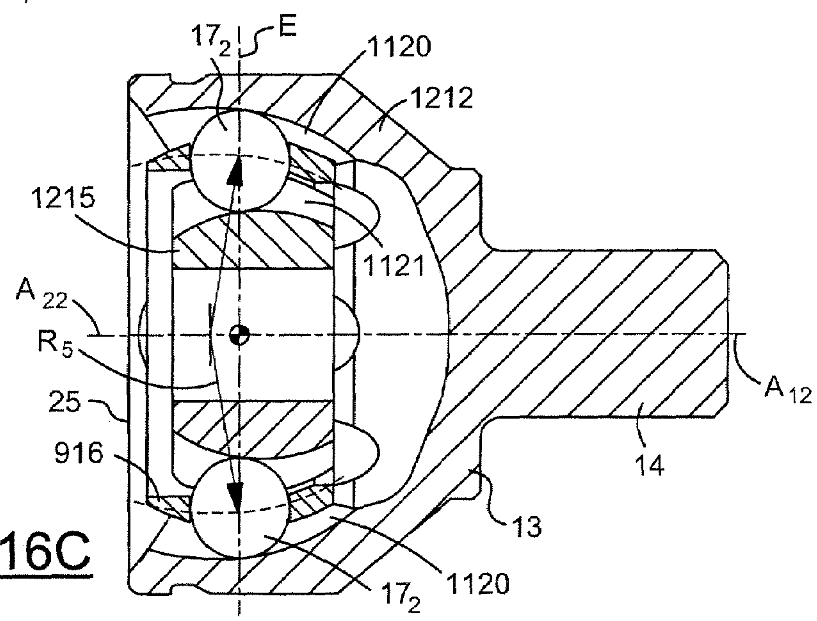
FIG. 16C

| α | 10° | 11° | 12° | 13° | 14° | 15° | 16° | 17° | 18° |
|---|---|---|---|---|---|---|---|---|---|
| ε | + + | + + | + + | + + | + + | + | + | − | − − |
| ε´ | − − | − | + | + + | + + | + + | + + | + + | + + |

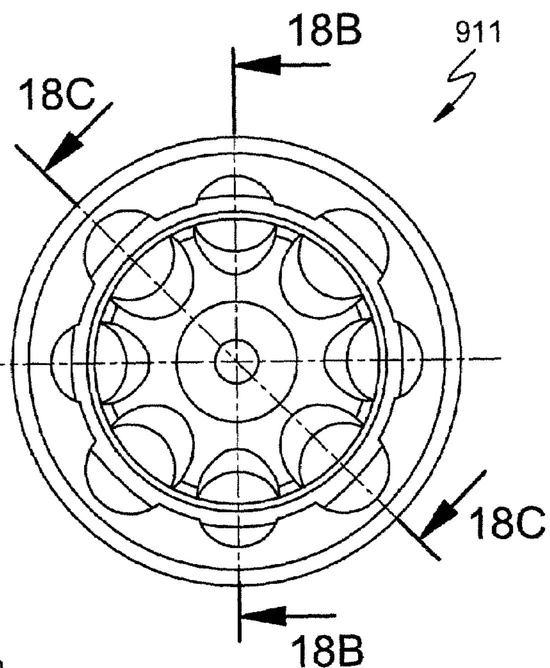
FIG. 18A
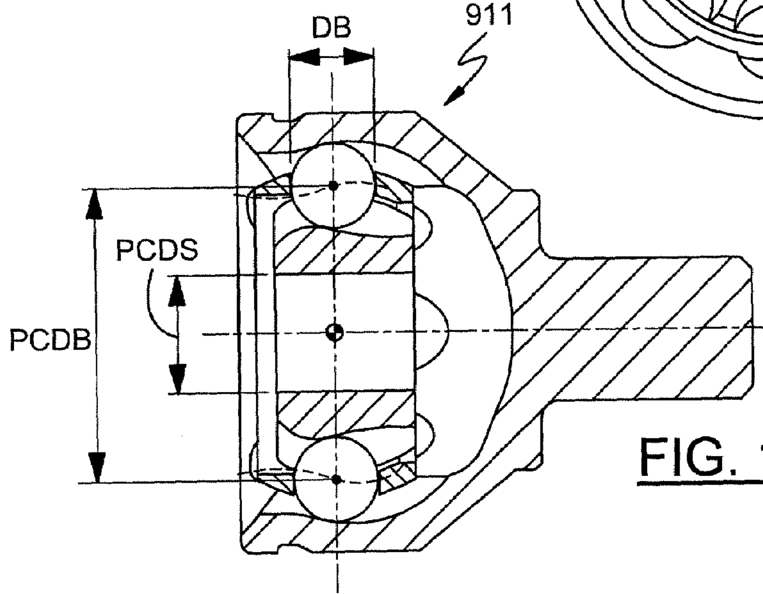
FIG. 18B
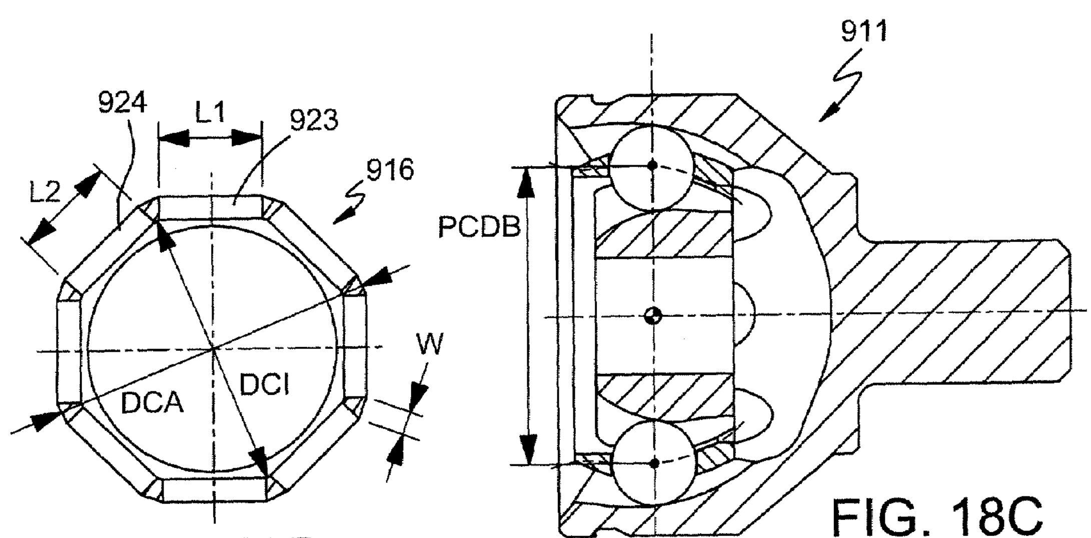
FIG. 18D
FIG. 18C

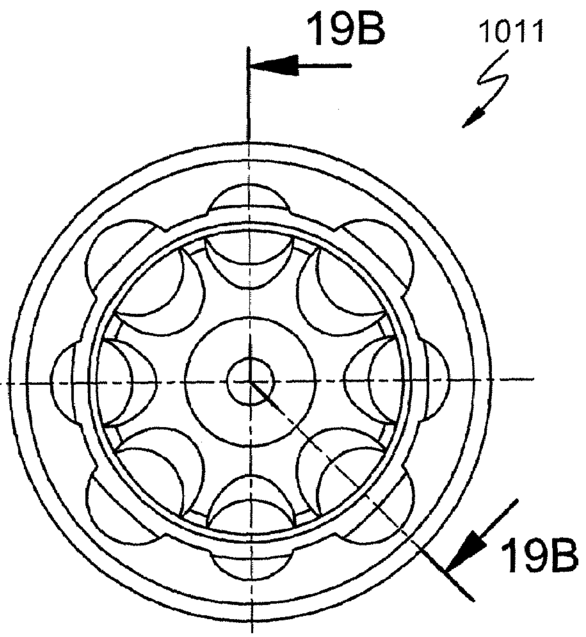
FIG. 19A
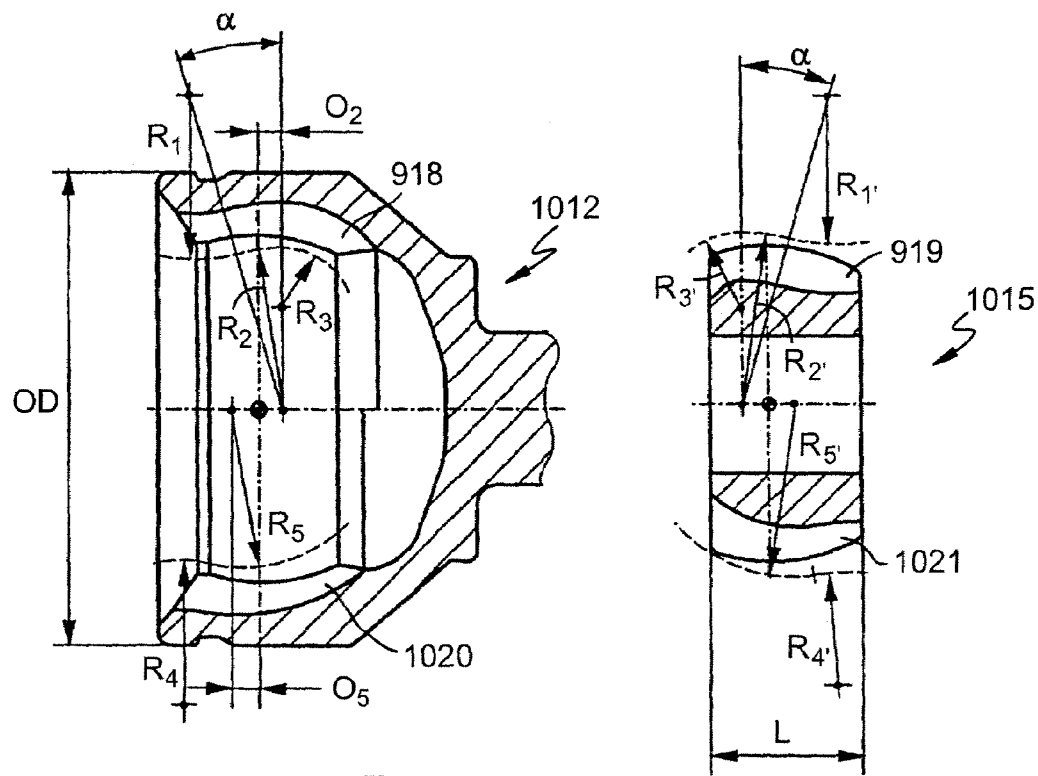
FIG. 19B
FIG. 19C

COUNTER TRACK JOINT WITH TRACK TURNING POINT

TECHNICAL FIELD

The invention relates to a constant velocity joint in the form of a counter track joint with the following characteristics: an outer joint part which comprises a first longitudinal axis and an attaching end and an aperture end which are axially opposed relative to one another, and which outer joint part further comprises first outer ball tracks and second outer ball tracks; an inner joint part which comprises a second longitudinal axis and attaching means for a shaft pointing to the aperture end of the outer joint part, and which inner joint part further comprises first inner ball tracks and second inner ball tracks; the first outer ball tracks and the first inner ball tracks form first pairs of tracks with one another; the second outer ball tracks and the second inner ball tracks form second pairs of tracks with one another; the pairs of tracks each accommodate a torque transmitting ball; a cage is positioned between the outer joint part and the inner joint part and comprises circumferentially distributed cage windows which each accommodate at least one of the balls; when the joint is in the aligned condition, the aperture angle of the first pairs of tracks opens in the central joint plane from the aperture end to the attaching end of the outer joint part; when the joint is in the aligned condition, the aperture angle of the second pairs of tracks opens in the central joint plane from the attaching end to the aperture end of the outer joint part.

BACKGROUND

In principle, counter track joints of the above-mentioned type are known from U.S. Pat. No. 6,848,999 showing joints with 6 balls and with 8 balls. The type of ball tracks described here corresponds to the type known in itself from Rzeppa joints (RF joints) and undercut-free joints (UF joints). This means that the center lines of the ball tracks consist of uniform radii (RF joints) and, respectively, are composed of radii and adjoining axis-parallel straight lines (UF joints). In the counter track joints described, the axial opening direction of the pairs of tracks alternates around the circumference, which leads to the type of counter track joint. Counter track joints of this type are disadvantageous in that the angle of articulation is limited to approximately 45 degrees because when this angle of articulation is exceeded, the first ball in the joint articulation plane leaves the first pairs of track.

From DE 103 37 612 A1 there are known counter track joints wherein the track center lines of the first pairs of tracks whose opening angle—when the joint is in the aligned condition—points towards the joint base, are designed in such a way that, when the joint is articulated, the opening angle, from a certain angle of articulation onwards, experiences a reversal of its direction of opening. More particularly, this is achieved in that the center lines of the ball tracks of the first pairs of tracks are S-shaped and thus each comprise a turning point.

U.S. Publication No. 2004/116192, inter alia, describes counter track joints wherein the center lines of the first outer ball tracks comprise a turning point near the joint aperture, so that the center lines of the first outer ball tracks are S-shaped. Because of the requirement of symmetry, the same applies to the center lines of the first inner ball tracks of the inner joint part. The angle of articulation of said counter track joints can be increased in this way.

As far as joints of the two latter types are concerned, the basic principle of counter track joints, i.e. atlernately opposed directions of the track opening angles and thus alternately opposed directions of the axial forces of balls acting on the ball cage only applies until a ball has reached the turning point from the inwardly curved track region to the outwardly curved track region. When the angle of articulation at which the ball occupies said second track region of the respective S-shaped tracks has been reached, the track opening angles are no longer, in their entirety, alternately directed around the circumference and the axial forces applied by the balls to the ball cage are no longer axially balanced. The counter track principle thus no longer applies and the ball cage has to axially support itself at the outer joint part and/or on the ball hub. Because of the increased internal friction between the ball cage and the outer joint part and inner joint part respectively, this can lead to a reduced service life.

SUMMARY OF THE INVENTION

Based on this, it is an object of the present invention, starting from the state of the art mentioned initially, to develop a fixed joint of the counter track type, which can achieve increased angles of articulation and features an increased service life.

One solution provides a joint with the following characteristics: an outer joint part which comprises a first longitudinal axis and an attaching end and an aperture end which are axially opposed relative to one another, and which outer joint part further comprises first outer ball tracks and second outer ball tracks; an inner joint part which comprises a second longitudinal axis and an attaching mechanism for a shaft pointing to the aperture end of the outer joint part, and which inner joint part further comprises first inner ball tracks and second inner ball tracks; the first outer ball tracks and the first inner ball tracks form first pairs of tracks with one another; the second outer ball tracks and the second inner ball tracks form second pairs of tracks with one another; the pairs of tracks each accommodate a torque transmitting ball; a ball cage is positioned between the outer joint part and the inner joint part and comprises circumferentially distributed cage windows which each accommodate at least one of the balls; when the joint is in the aligned condition, the aperture angle of the first pairs of tracks opens in the central joint plane from the aperture end to the attaching end of the outer joint part; when the joint is in the aligned condition, the aperture angle of the second pairs of tracks opens in the central joint plane from the attaching end to the aperture end of the outer joint part, wherein the central track lines of the first pairs of tracks each have a turning point $T_{1-2}$ and that the center angel $\beta$ from the joint center M to the turning point, with reference to the central joint plane, is greater than 4°. In this way it is ensured that, within the service life range of operation, the joint operates according to the principle of a counter track joint. The service life range of operation refers to joint operation within the service life angle at which the design service life of the joint is reached under changing load conditions without the joint suffering any damage.

This means that within the so-called service life range, the principle of the counter track joint always applies, so that the service life is prolonged. The service life range is defined by the service life angle $\beta_L$. If operated within this angle of articulation, the joint, by definition, reaches the design service life. At the same time, however, a further joint articulation is possible so that greater angles of articulation can be achieved. In accordance with the invention, the transition to the second range is defined in such a way that it is located outside the track region which is passed by the balls in the service life range in the ball tracks. Below, preferred embodiments will be described for the position of said turning point. It has to be explained here how the term "turning point" is used: on the one hand, in the mathematically applicable sense of a translation from a curvature into a counter-curvature and on the other hand, in a mathematically inaccurate sense for the transition from a curvature into a straight line tangentially adjoining the curvature. Both interpretations apply to the term "turning point" used here. It would also be possible to use the term "tangent point".

According to a first embodiment, the center angle $\beta$ from the joint center M to the turning point $P_{1-2}$, with reference to the central joint plane E, is greater than 5°. According to a further embodiment, the center angle $\beta$ from the joint center M to the turning point $P_{1-2}$, with reference to the central joint plane E, is smaller than 12°.

Furthermore, it is proposed that a tangent $T_{1-2}$ at the central track line of the first pairs of tracks in the turning point $P_{1-2}$ forms a turning point angel $\alpha$, with the respective longitudinal axis and, respectively, that a perpendicular line on said tangent $T_{1-2}$ forms a turning point angle $\alpha$ with the central joint plane (E), which turning point angle is defined by:

$$\alpha \geq \beta + \arcsin\left[\frac{O_2}{R_2} - \sin(\beta + 90°)\right]$$

wherein $O_2$ is the axial distance between the point of intersection of a perpendicular line on the tangent $T_{1-2}$ and the respective longitudinal axis A from the central joint plane E and wherein R2 is the distance between said point of intersection and the turning point $P_{1-2}$.

According to a further first special embodiment the turning point angle $\alpha$ is defined by:

$$\alpha \geq \beta + \arcsin\left[\frac{O_2 + a \cdot \tan(\beta)}{R_2} - \sin(\beta + 90°)\right]$$

if the respective track center lines in the central joint plane E and up to the turning point $T_{1-2}$ comprise a radius $R_2$ whose center $M_2$ comprises an axial distance $O_2$ from the central joint plane E and a radial distance a from the respective longitudinal axis in the direction towards the turning point $T_{1-2}$.

An alternative special embodiment provides that the turning point angle $\alpha$ is defined by:

$$\alpha \geq \beta + \arcsin\left[\frac{O_2 - b \cdot \tan(\beta)}{R_2} - \sin(\beta + 90°)\right]$$

if the respective track center line in the central joint plane E and up to the turning point $T_{1-2}$ comprise a radius $R_2$ whose center $M_2$ comprises an axial distance $O_2$ from the central joint plane E and a radial distance b from the respective longitudinal axis A in the direction away from the turning point $T_{1-2}$.

An inventive counter track joint with 8 balls for an angle of articulation of 47-52° is optimised if the following relationships are observed between individual measured parameters:

⅕<PCDB/R1<1.9

1.8<PCDB/R2<2.2

2.3<PCDB/R3<2.7

2.1<PCDB/R4<2.5

1.8<PCDB/R5<2.2

12<PCDB/O2<16

12<PCDB/O5<16

0.6<PCDB/OD<0.8

2.1<PCDB/L<2.5

3.4<PCDB/DB<4.0

2.1<PCDB/DS<2.5

0.75<PCDB/DCA<1.05

0.85<PCDB/DC1<1.15

7.5<PCDB/W<11.5

2.8PCDB/L1<3.4

2.6<PCDB/L2<3.2

In said relationships, the parameters used have the following meaning:

PCDB: pitch circle diameter of balls

R1:outer part ball track radius 1 (first ball tracks)

R2:outer part ball track radius 2 (first ball tracks)

R3:outer part ball track radius 3 (first ball tracks)

R4:outer part ball track radius 4 (second ball tracks)

R5:outer part ball track radius 5 (second ball tracks)

O2:outer part ball track offset for track with opening angle towards attaching end O5:outer part ball track offset for track with opening angle towards aperture end OD:outer diameter outer part L:length inner part DB:ball diameter PCDS:pitch circle diameter of splines DCA:cage outer diameter DCI:cage inner diameter W:cage web width L1:cage window length 1 (first cage windows)

L2:cage window length 2 (second cage windows)

BRIEF DESCRIPTION OF THE DRAWINGS

Several embodiments of the invention are illustrated in the drawings and will be described below.

A) in a complete view in a longitudinal section; and

B) with its outer joint part in the form of a detail in a longitudinal section.

Figure 1A:
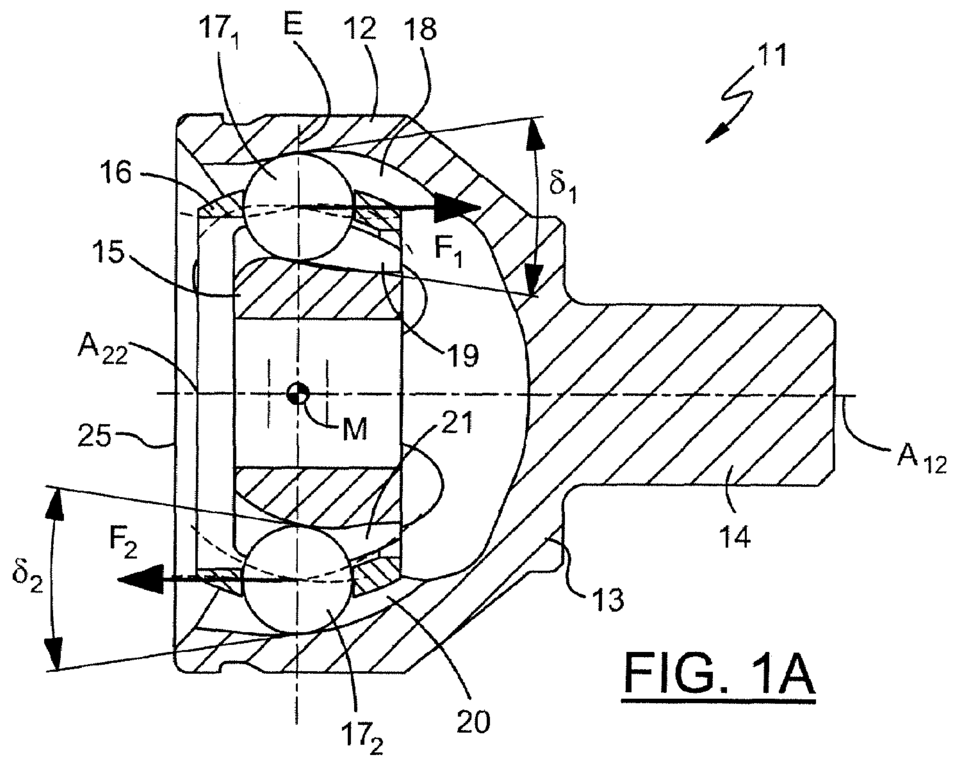
FIG. 1 shows an inventive counter track joint with 6 balls in a first embodiment.
Figure 1B:
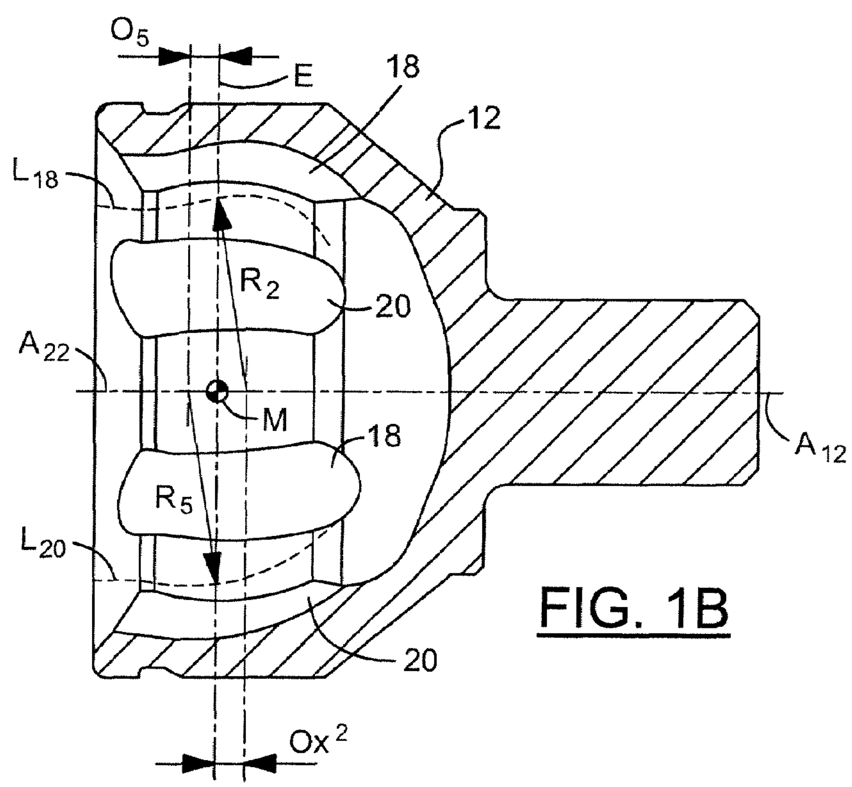

FIG. 2 shows a counter track joint with 6 balls according to FIG. 1;

A) in a longitudinal section with dimensional specifications;

B) in a longitudinal section with further dimensional specifications; and

C) the ball cage as a detail in a developed view.

FIG. 3 shows a counter track joint with 8 balls similar to that shown in FIGS. 1 and 2:

A) with dimensions in a longitudinal section;

B) in an angled position with further dimensional specifications; and

C) the ball cage as a detail in a developed view.

FIG. 4 shows an inventive joint with 6 balls in a second embodiment:

A) in a complete view in a longitudinal section;

B) the outer joint part as a detail in a longitudinal section; and

C) the inner joint as a detail in a longitudinal section.

Figure 5:
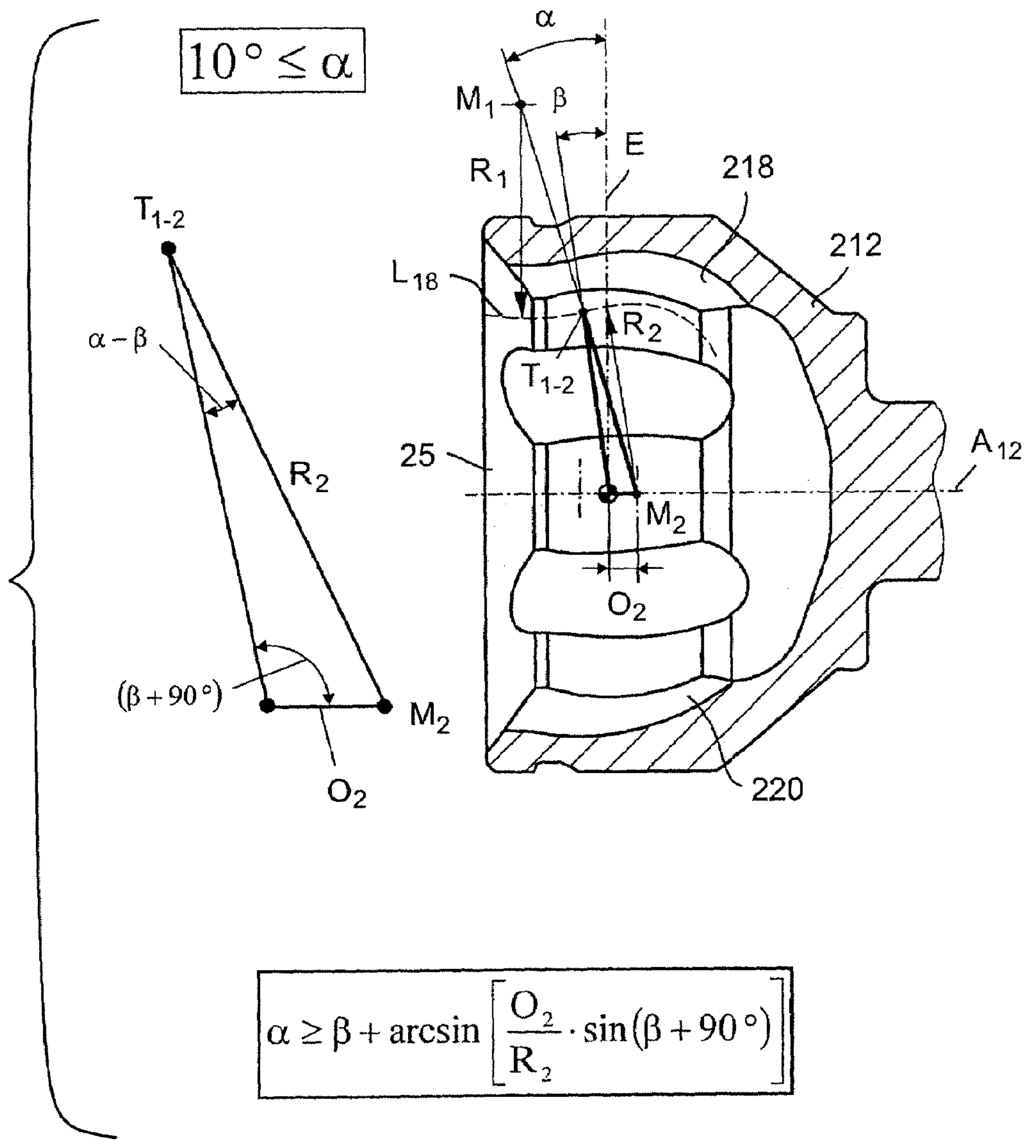

FIG. 5 shows the outer joint part of an inventive joint according to FIG. 4 with further dimensional specifications in a longitudinal section.

Figure 6:
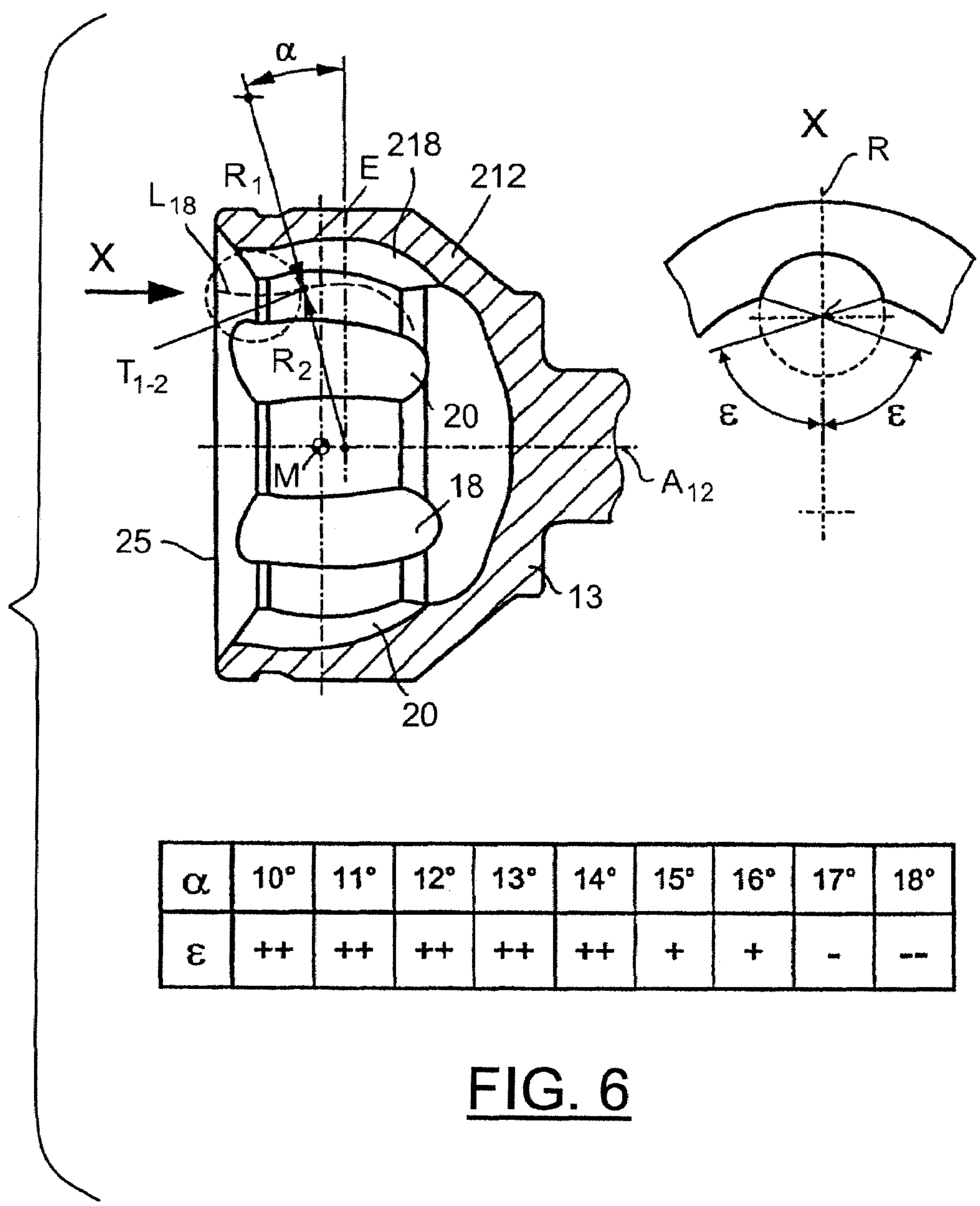

FIG. 6 shows the inventive join according to FIGS. 4 and 5 with further dimensional specifications:

A) in a longitudinal section through the outer joint part;

B) in a cross-section through the ball tracks; and

C) an evaluation table.

Figure 7:
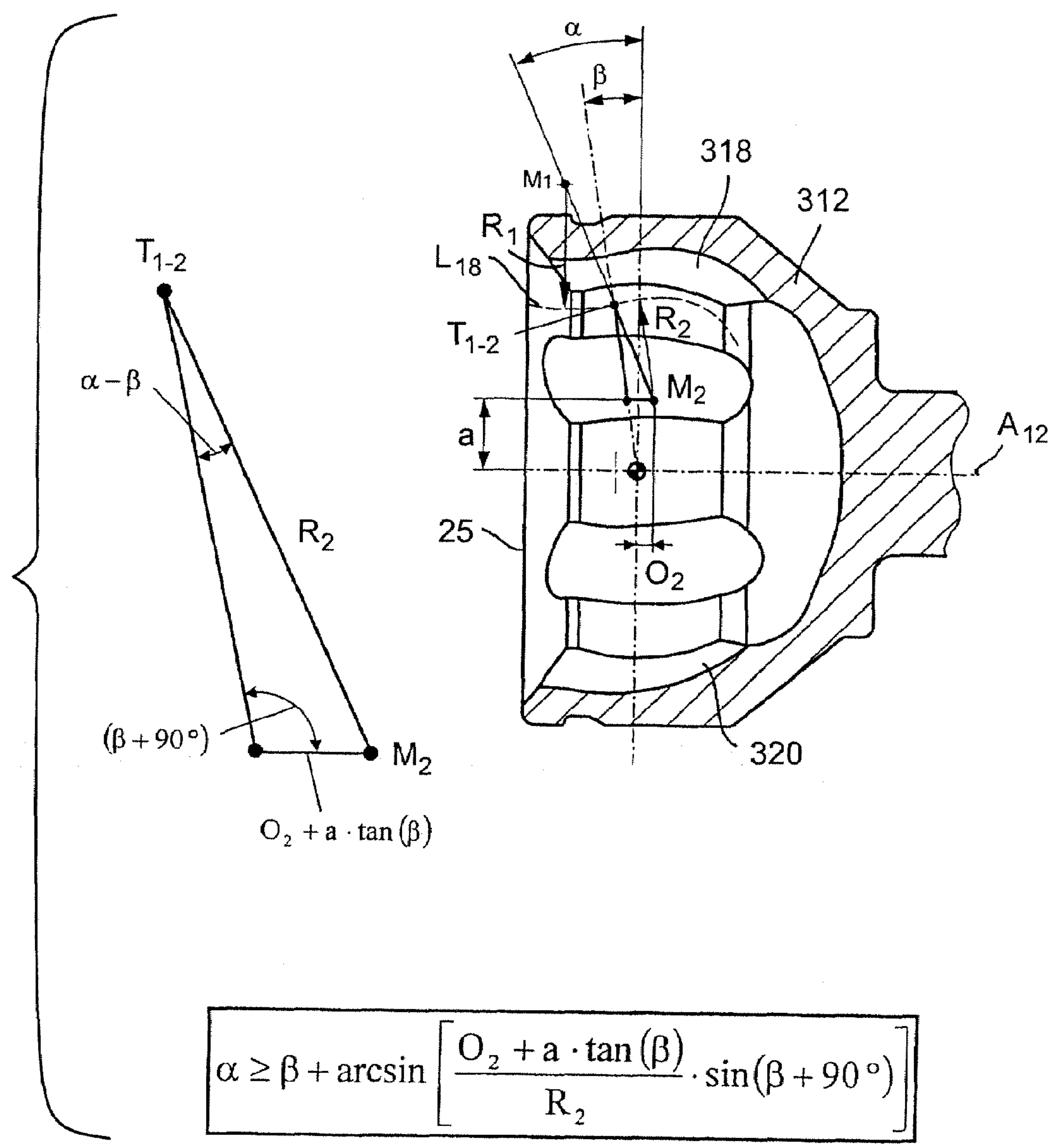

FIG. 7 shows the outer joint part of an inventive joint in a further embodiment in a longitudinal section with dimensional specifications.

Figure 8:
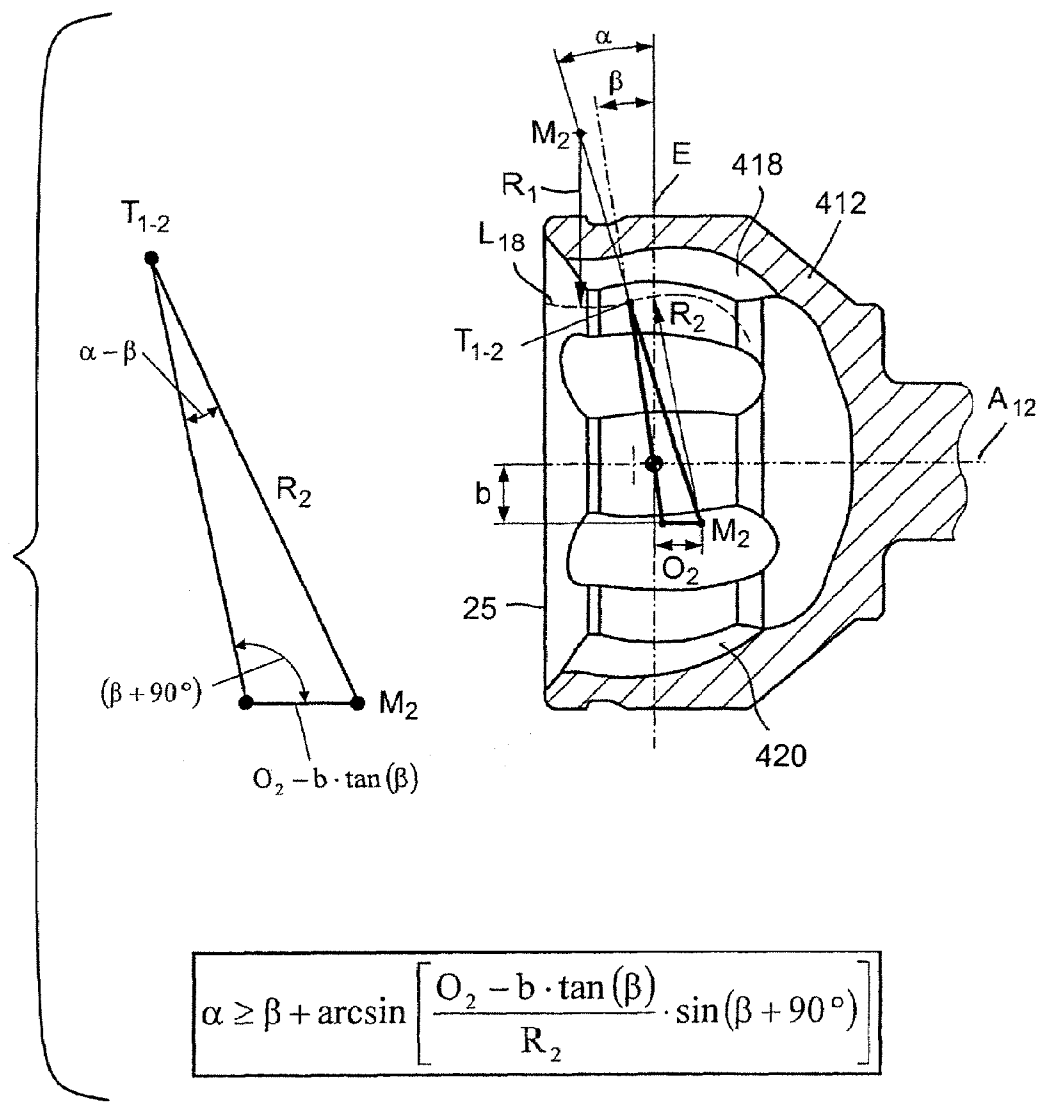

FIG. 8 shows the outer joint part of an inventive joint in a further embodiment in a longitudinal section with dimensional specifications.

Figure 9A:
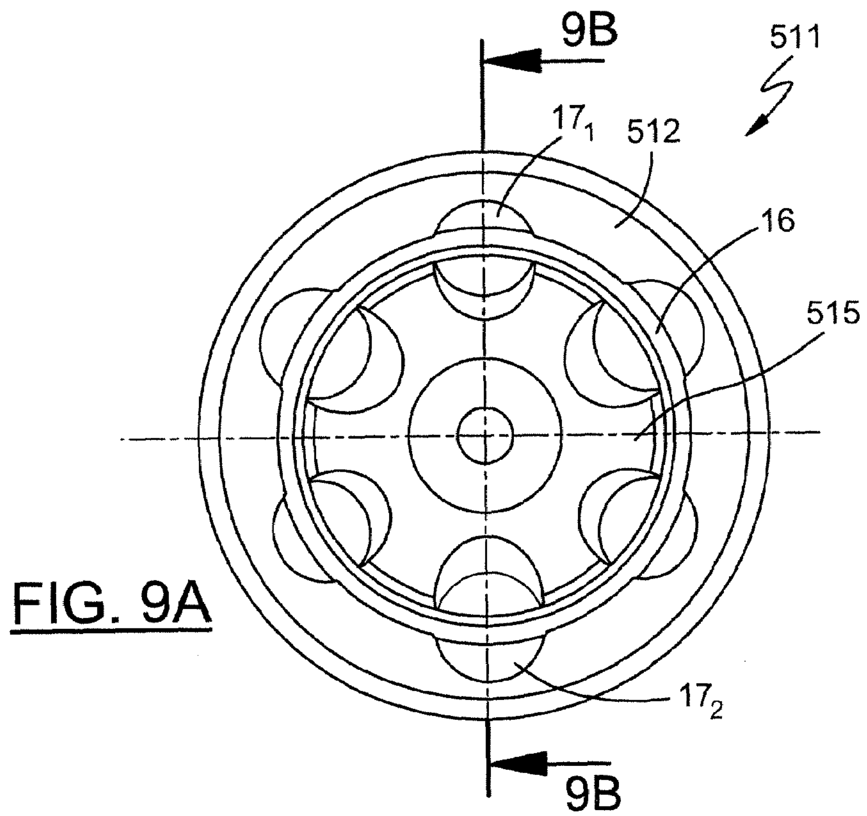
Figure 9B:
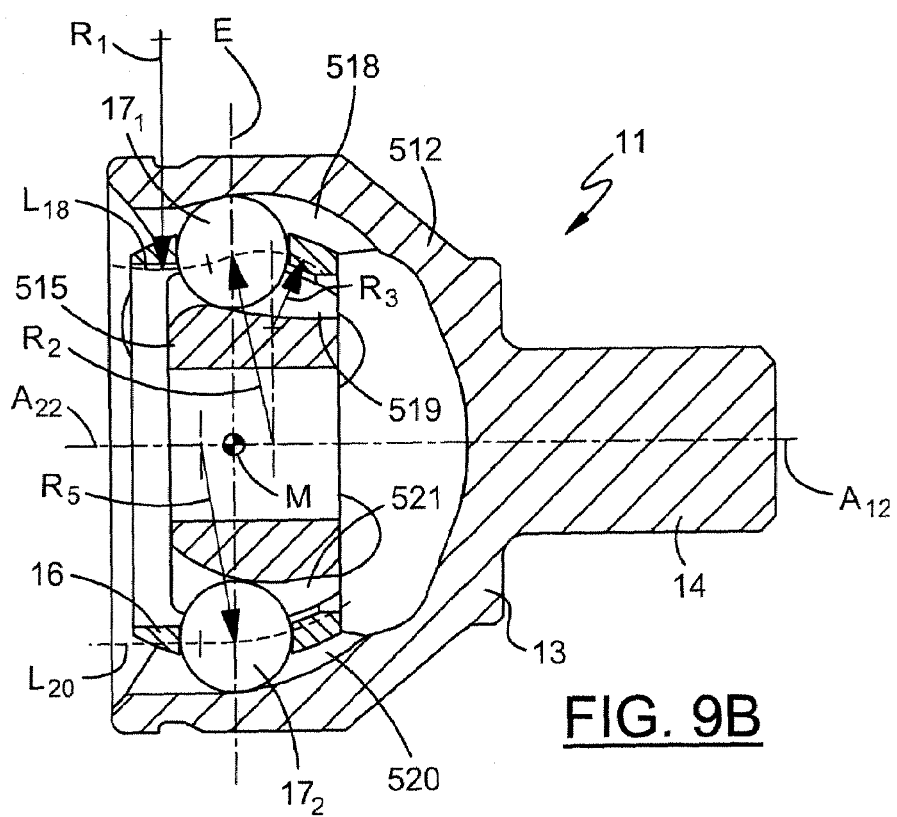

FIG. 9 shows an inventive 6-ball counter track joint with dimensional specifications of the counter tracks:

A) in an axial view; and

B) in a longitudinal section.

Figure 10A:
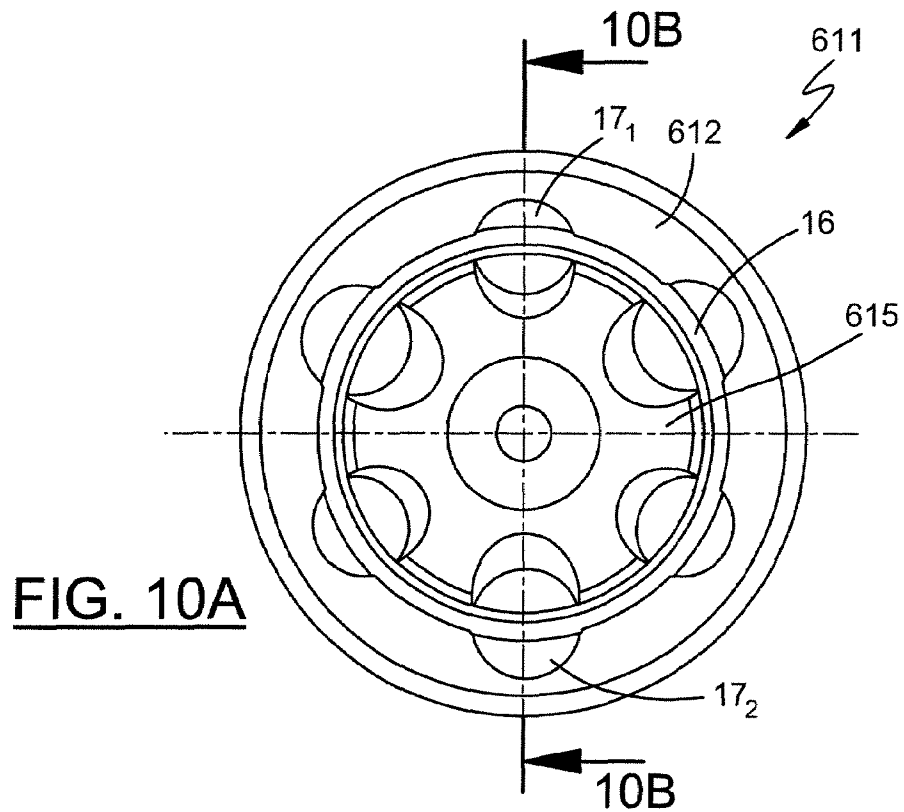
Figure 10B:
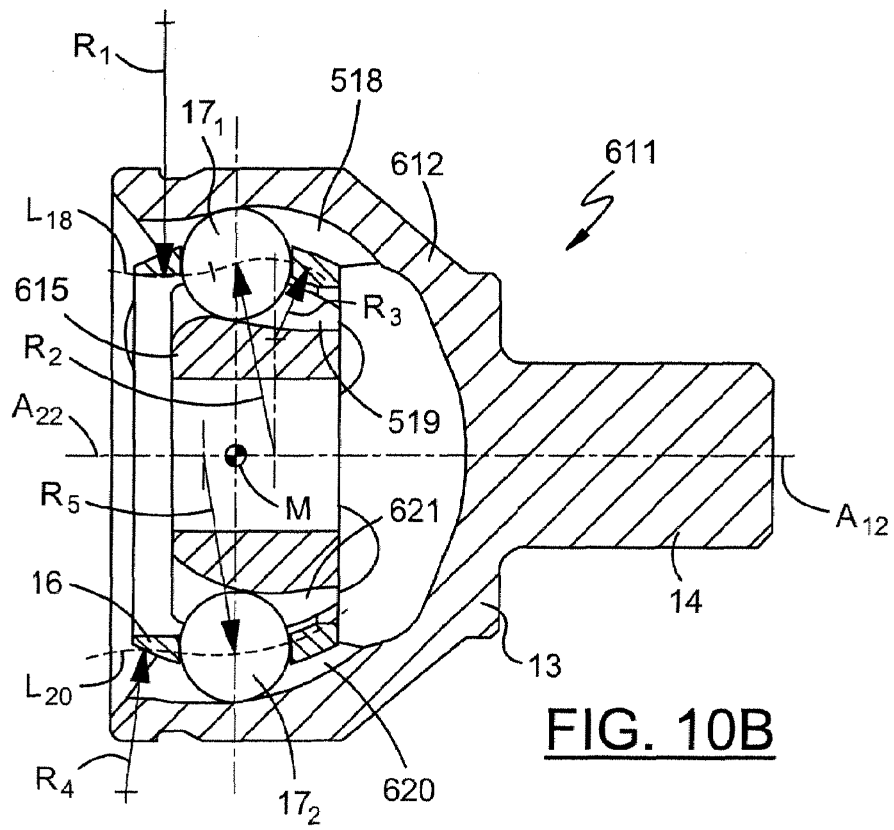

FIG. 10 shows an inventive 6-ball counter track joint with dimensional specifications of the counter tracks:

A) in an axial view; and

B) in a longitudinal section.

Figure 11A:
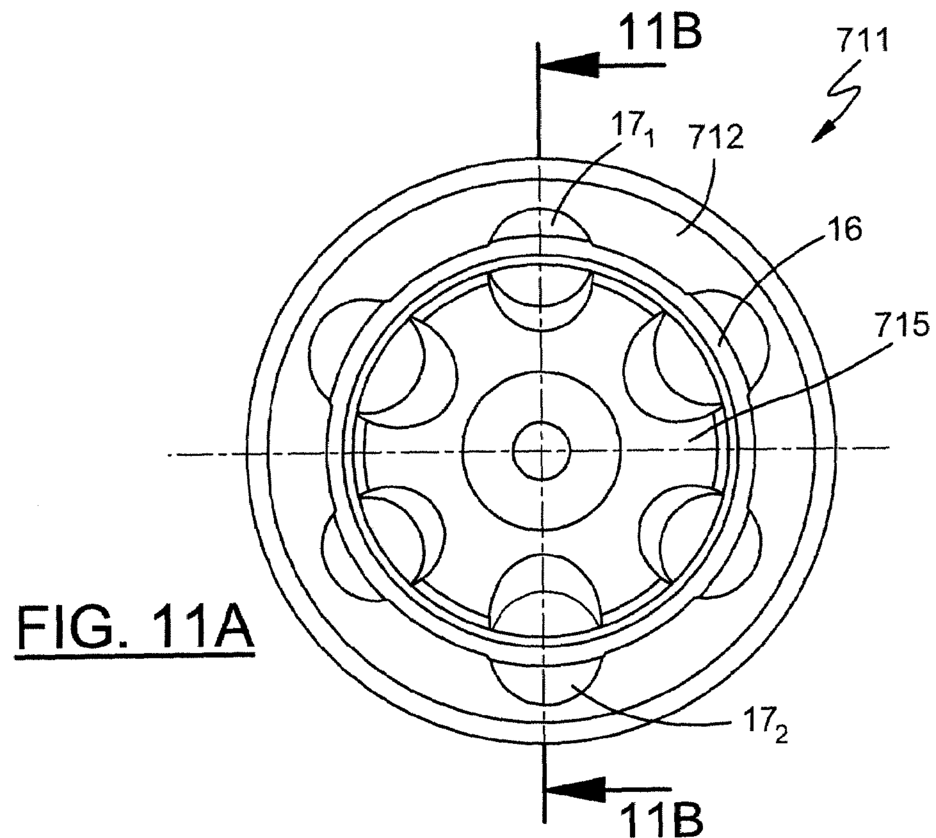
Figure 11B:
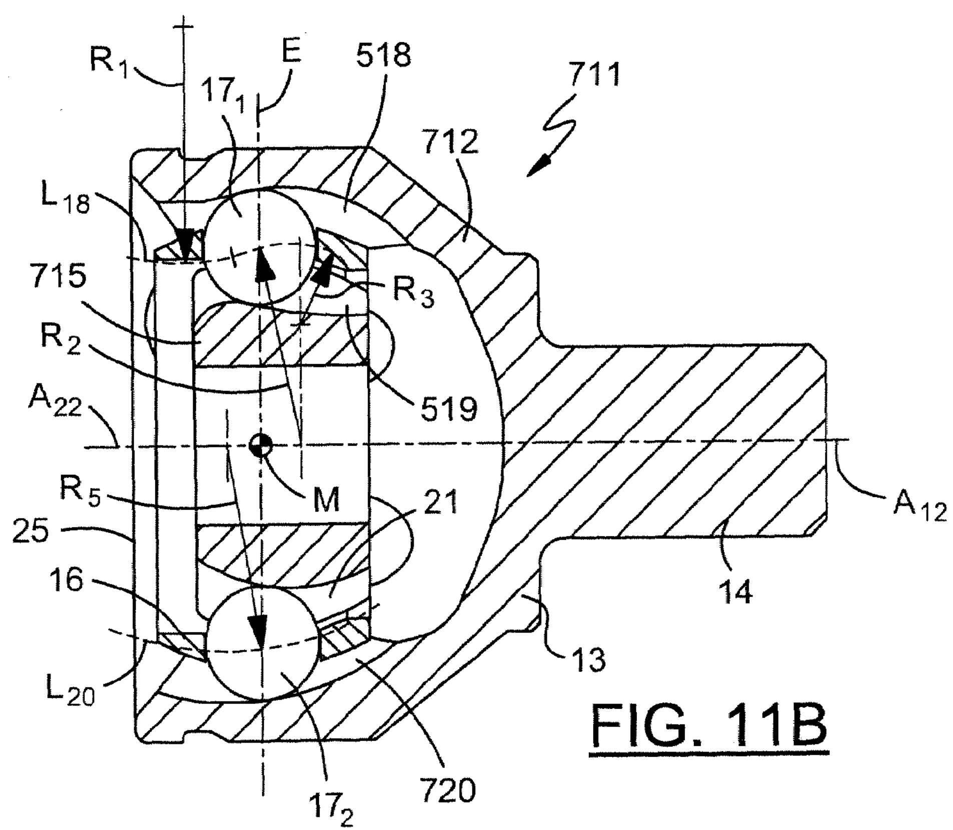

FIG. 11 shows an inventive 6-ball counter track joint with dimensional specifications of the counter tracks:

A) in an axial view; and

B) in a longitudinal section.

Figure 12A:
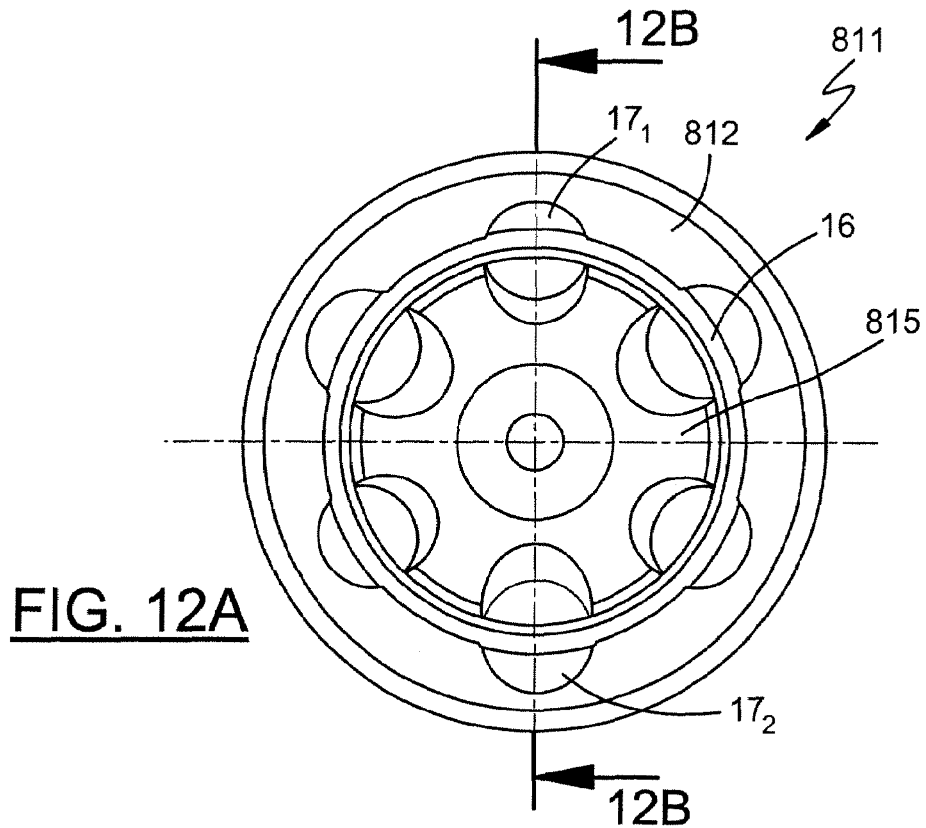
Figure 12B:
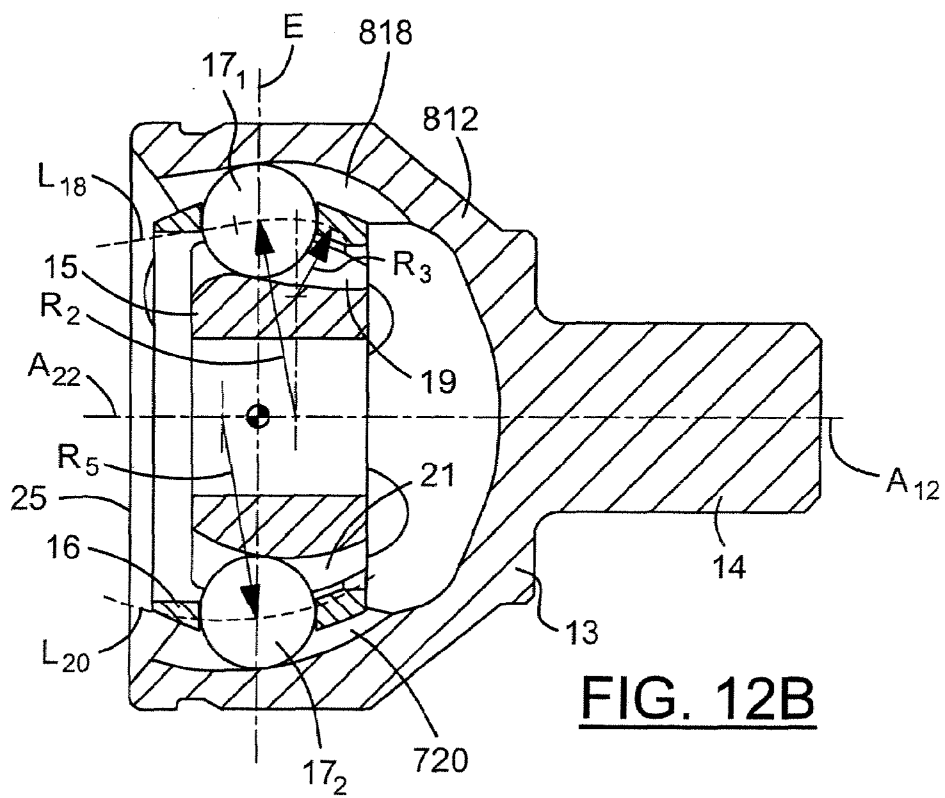

FIG. 12 shows an inventive 6-ball counter track joint with dimensional specifications of the tracks:

A) in an axial view; and

B) in a longitudinal section through the joint (RF track).

Figures 13A, 13B, 13C:
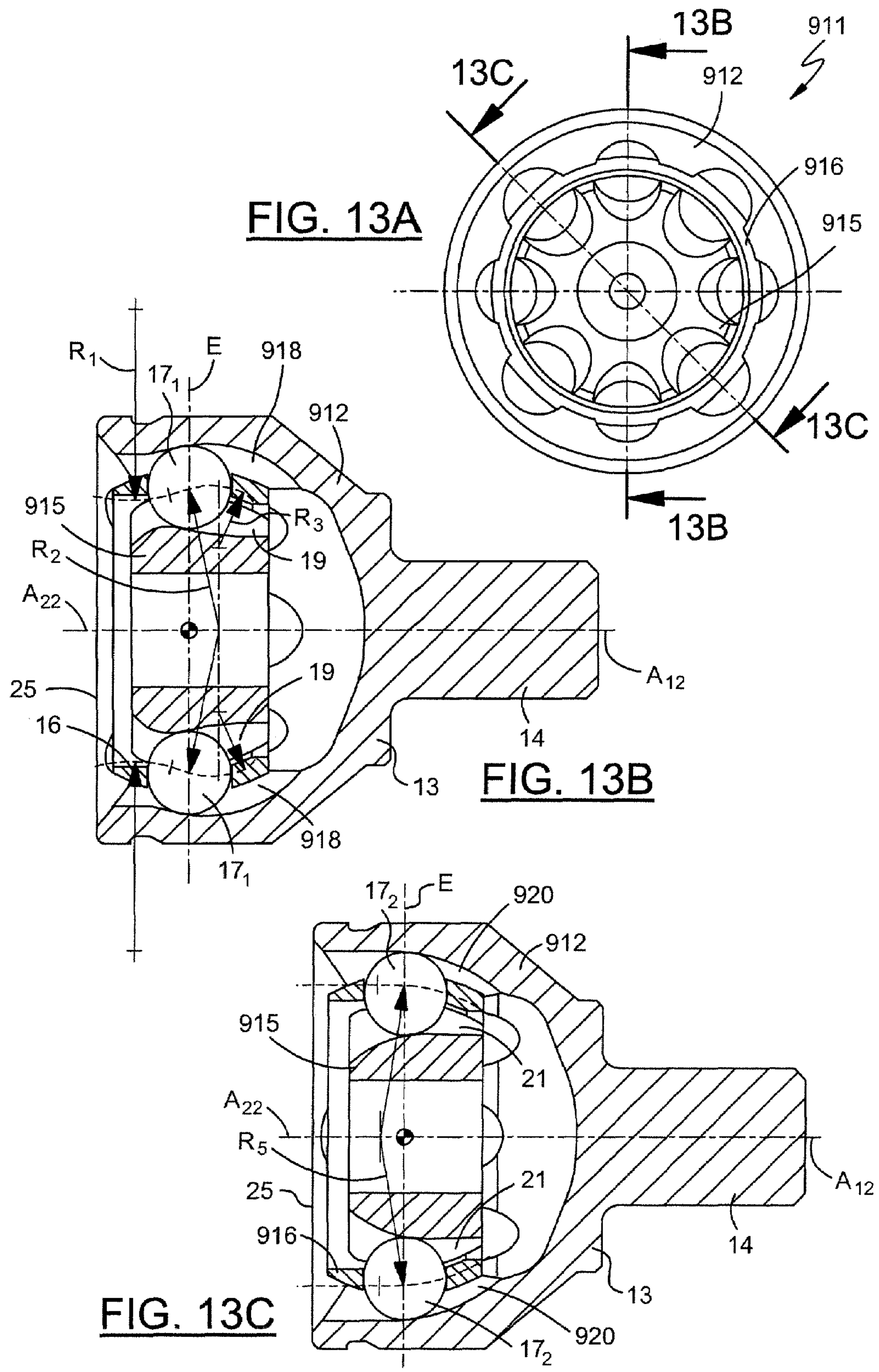

FIG. 13 shows an inventive 6-ball counter track joint with dimensional specifications of the counter tracks:

A) in an axial view;

B) in a first longitudinal section; and

C) in a second longitudinal section.

Figures 14A, 14B, 14C:
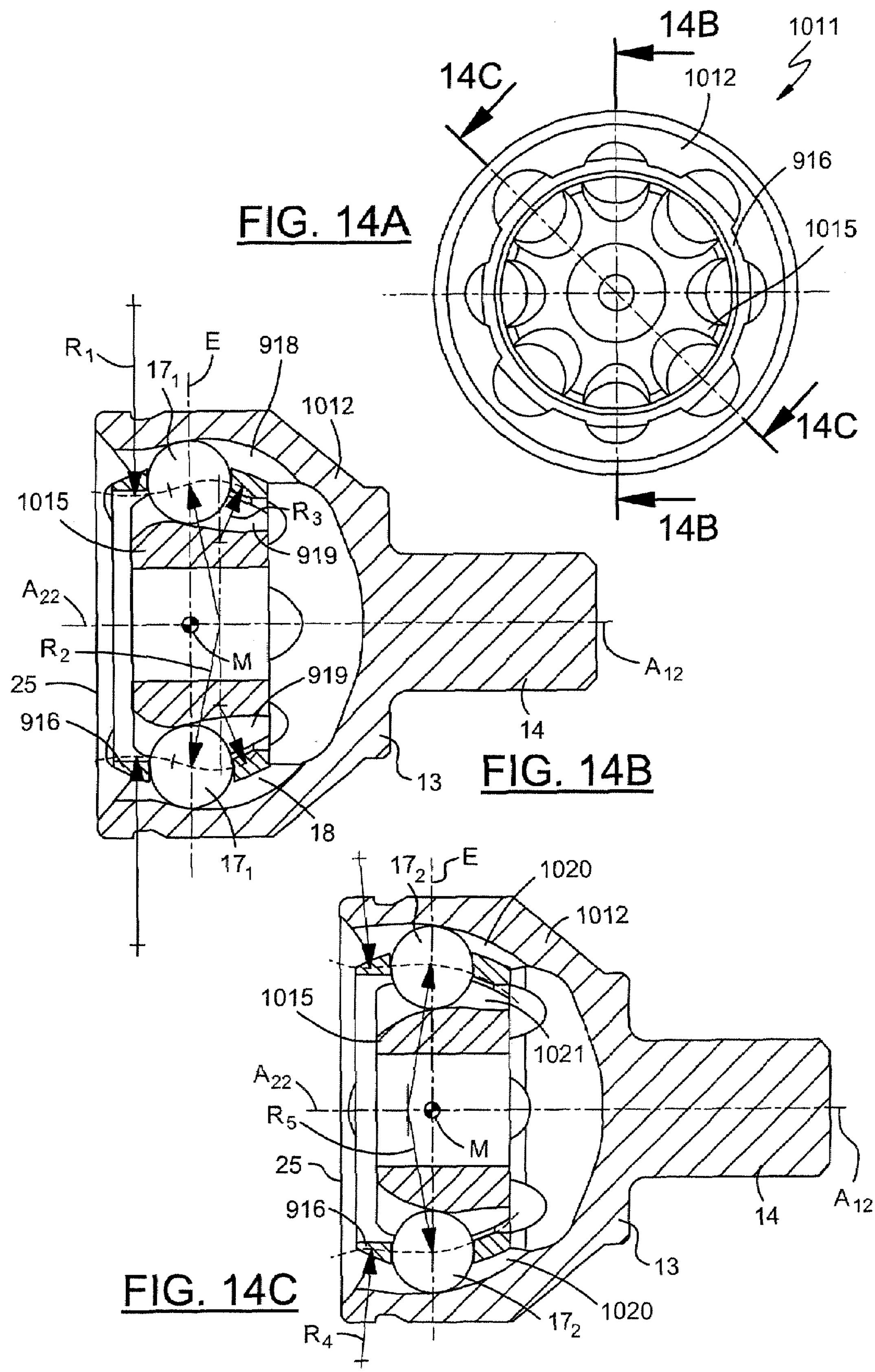

FIG. 14 shows an inventive 8-ball counter track joint:

A) in an axial view;

B) in a first longitudinal section; and

C) in a second longitudinal section.

Figure 15A:
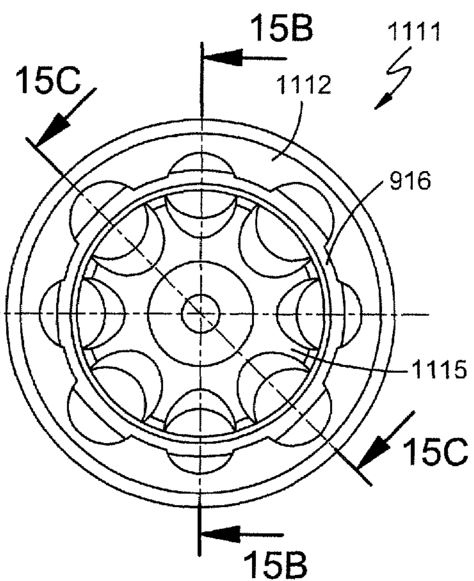
Figure 15B:
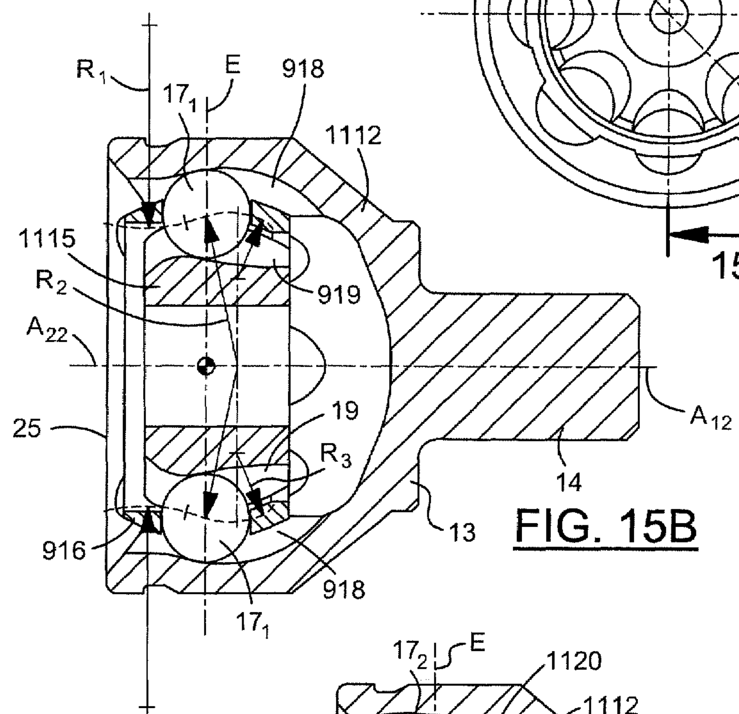
Figure 15C:
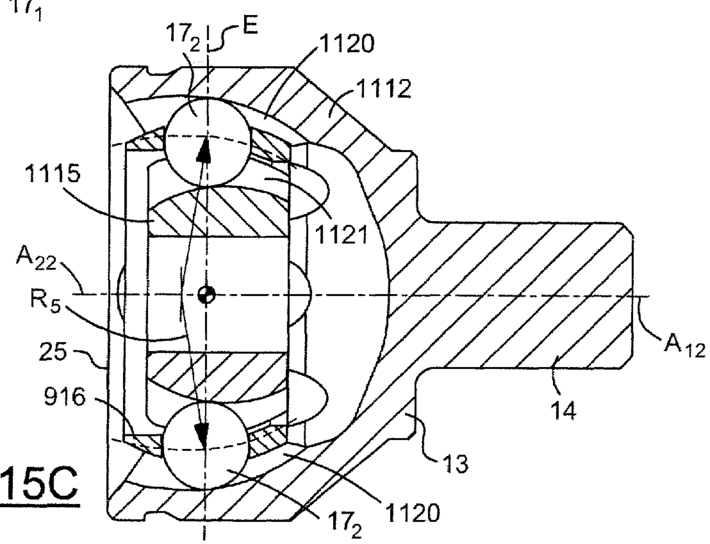

FIG. 15 shows an inventive 8-ball counter track joint:

A) in an axial view;

B) in a first longitudinal section; and

C) in a second longitudinal section.

FIG. 16 shows an inventive 8-ball counter track joint:

A) in an axial view;

B) in a first longitudinal section; and

C) in a second longitudinal section.

Figure 17:
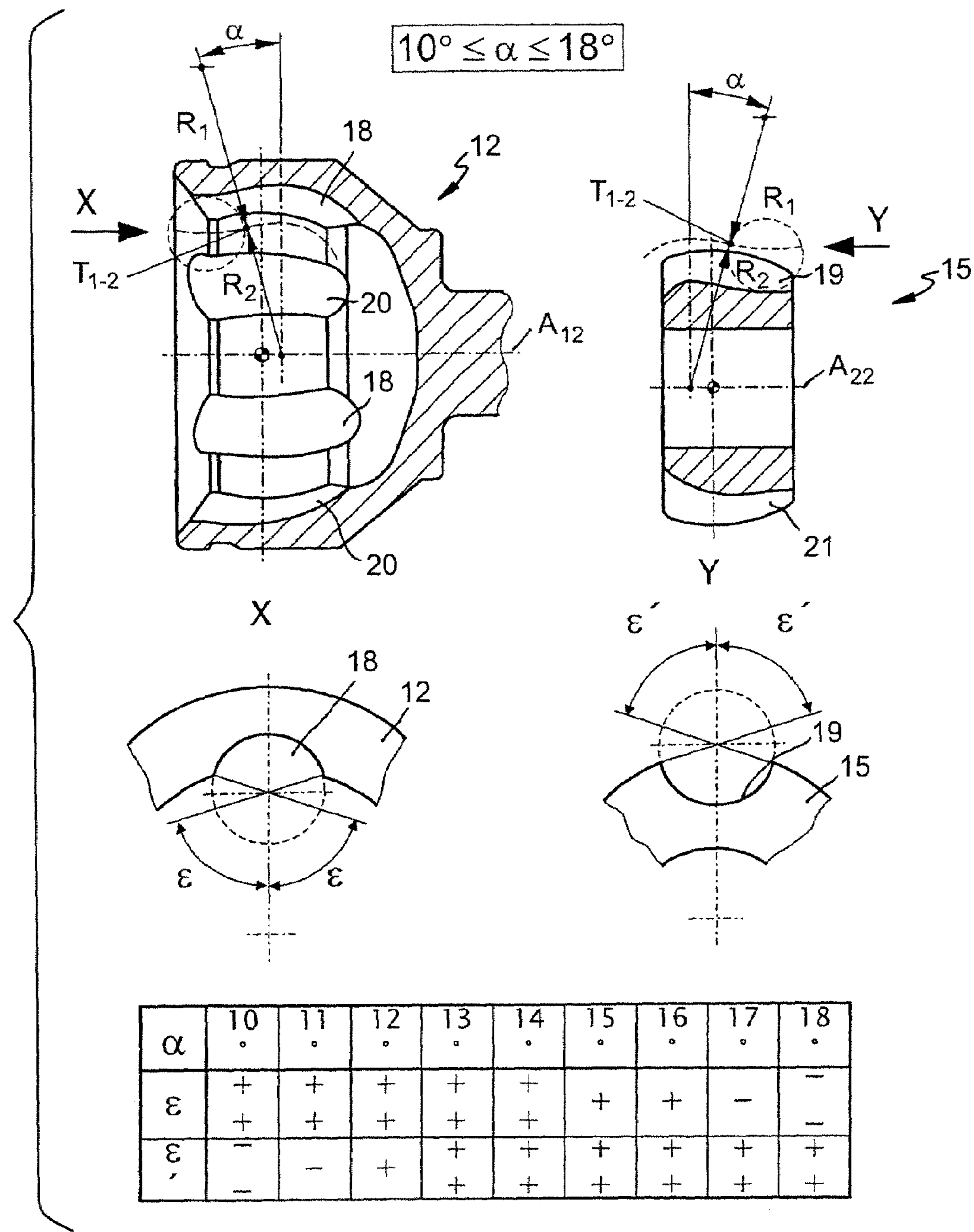

FIG. 17 shows an inventive 6-ball counter track joint with a definition of the tracks and with further details:

A) the outer joint part in a longitudinal section;

B) an outer track in a longitudinal section;

C) the inner joint part in a longitudinal section;

D) an inner track in a longitudinal section; and

E) an evaluation table.

FIG. 18 shows an inventive 8-ball counter track joint similar to that shown in FIG. 13, with a specification of individual parameters:

A) in an axial view;

B) in a first longitudinal section;

C) in a second longitudinal section; and

D) in a cross-section through the ball cage.

FIG. 19 shows an inventive 8-ball counter track joint similar to that shown in FIG. 13 with a specification of the tracks:

A) in an axial view;

B) in a longitudinal section through the outer joint part; and

C) in a longitudinal section through the ball cage.

Figure 20:
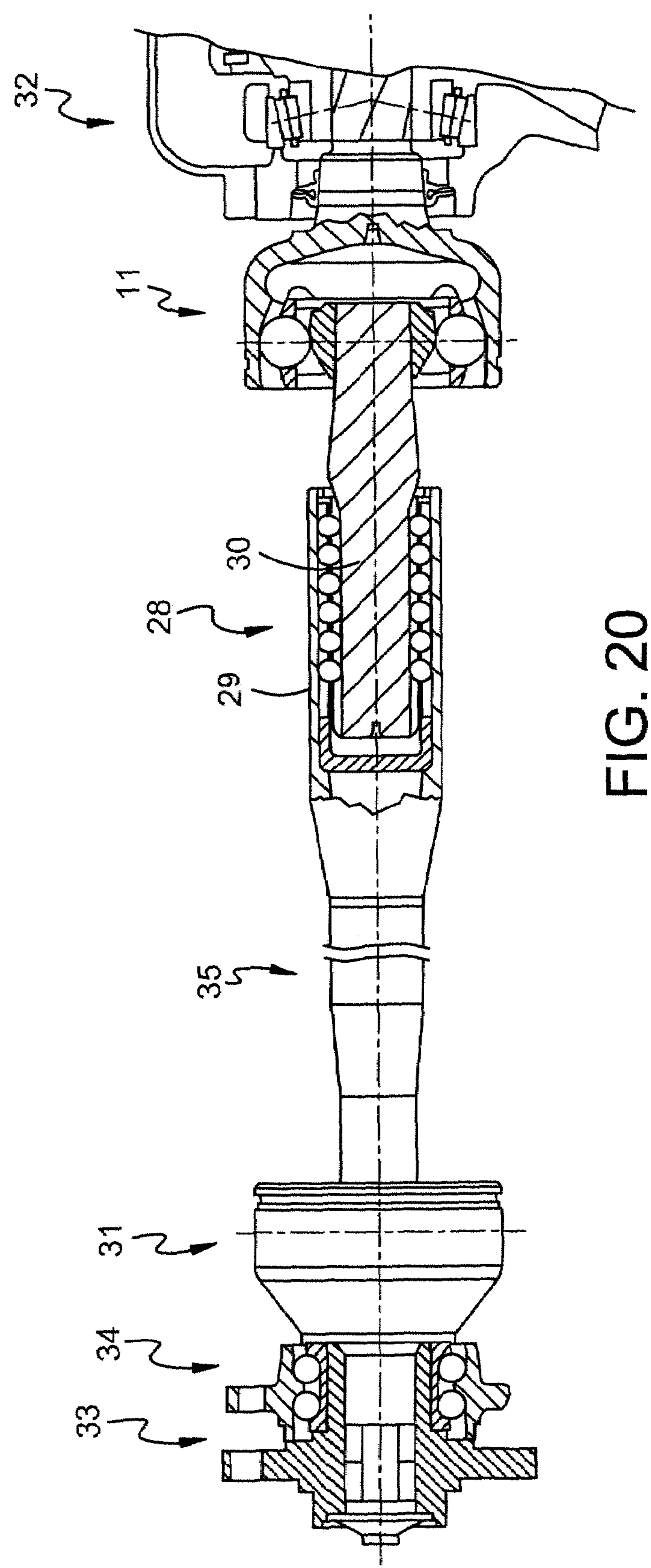

FIG. 20 shows an inventive driveshaft as incorporated into a motor vehicle in a partial longitudinal section.

DETAILED DESCRIPTION

The two illustrations of FIG. 1 will be described jointly below. An inventive constant velocity joint 11 comprises an outer joint part 12 with an aperture 25 with a closed base 13 and an integrally attached journal 14. Furthermore, the joint comprises an inner joint part 15, a ball cage 16 as well as torque transmitting balls 17. First outer ball tracks 18 and first inner ball tracks 19 accommodate balls $17_1$ and form first pairs of tracks with one another. Second outer ball tracks 20 and second inner ball tracks 21 form second pairs of tracks which receive second balls $17_2$. The two types of pairs of tracks are alternately arranged around the circumference. Tangents at the balls in the points of contact with the first pairs of tracks which are shown in the drawing, together, form an opening angle $\delta_1$ which opens in the direction towards the base 13. Tangents at the second balls $17_2$ in the points of contact with the second pairs of tracks, together, from an opening angle $\delta_2$ which opens towards the aperture 25 of the outer joint part. When the joint is in the aligned condition and subjected to torque, said opening angles generate axial forces referred to as $F_1$ and $F_2$ and apply those to the balls and thus to the ball cage 16. A central joint plane E which receives the centers of the balls intersects the longitudinal axis of the joint in a joint center M, which longitudinal axis of the joint is defined by the longitudinal axis $A_{12}$ of the outer joint part and by the longitudinal axis $A_{22}$ of the inner joint part. With reference to the center lines $L_{18}$ of the ball tracks 18 in the outer joint part 12, the tracks 18 in the central plane comprise a radius $R_2$ whose center is offset by an axial offset $O_2$ on the axis A relative to the joint center M, whereas the tracks 20 comprise an identically sized radius $R_5$ whose center is offset by an offset $O_5$ in the opposite direction relative to the joint center M.

In FIG. 2, any details identical to those shown in FIG. 1 have been given the same reference numbers. In FIG. 2A, a shaft 22 is inserted into the inner joint part 15. In addition to the longitudinal axis $A_{12}$ of the outer joint part, there is shown the longitudinal axis $A_{22}$ of the inner joint part which, in the same way, corresponds to the longitudinal axis of the inner joint part 15. With reference to the longitudinal axis $A_{22}$, service life angles $2\beta_{SL}$ are given on both sides; they indicate the maximum angle of articulation at which the joint can be operated without suffering any damage in the service life test. The service life test is meant to refer to a load spectrum which corresponds to the practical use of a joint in the course of the design service life. When the shaft 22 is articulated relative to the outer joint part 12 at the articulation angle $2\beta_{SL}$ on both sides each, the balls $\mathbf{17}_1$ in the inventive ball tracks 18, 19 carry out movements along the track center line, which movements are defined by the life angle $\beta_{SL}$ on both sides each from the central joint plane E, wherein the legs of the angle $\beta_{SL}$ are formed between the central joint plane E and by rays through the ball center and the joint center 11, when the shaft 22 is articulated relative to the outer joint part 12 at the service life angle $2\beta_{SL}$. FIG. 2C shows the ball cage 16 in a developed view with three circumferentially distributed cage windows 23, 24. Balls $\mathbf{17}_1$ held in first pairs of tracks apply an axial force $F_1$ to the ball cage and balls $\mathbf{17}_2$ held in second pairs of tracks apply an axial force $F_2$ to the ball cage. Because of the alternating arrangement of first and second pairs of tracks, even when transmitting torque across via the joint, is axially balanced.

In FIG. 3, the same features have been given the same reference numerals, and modified features have been indexed by 100. In FIG. 3A, with reference to the longitudinal $A_{22}$ of the shaft 22, there is shown on both sides each—in addition to the service life articulation angle $2\beta_{SL}$—the maximum articulation angle $2\beta_{max}$. Accordingly, with reference to the position of the ball center relative to the outer joint part, there are again shown the service life angles $\beta_{SL}$ as well the maximum articulation angles $\beta_{max/2}$ on both sides, starting from the central plane E. The ball positions in the outer joint part at the maximum joint articulation angle $2\beta_{max}$ are shown in dashed lines.

FIG. 3B shows the maximum articulation angle at the joint 111 in a direction in which the balls $\mathbf{17}_1$ move in the inventive pairs of tracks 118, 119 towards the aperture 25 of the outer joint part 112. Because of the S-shaped course followed by the inventive ball tracks 118, 119, the opening angle $\delta_1$ between the tangents at the balls $\mathbf{17}_1$ in the first pairs of tracks has reversed its direction and also opens towards the aperture end of the outer joint part 112, whereas the second pairs of tracks with tracks 120, 121 of the Rzeppa joint type form an opening angle $\delta_2$ whose size, admittedly, changes, but which, as in the aligned joint position according to FIG. 2, continues to open towards the aperture end of the outer joint part 112. The directions of the forces $F_1$, $F_2$ acting on the balls in the sectional plane correspond to the opening angles $\delta_1$, $\delta_2$. As can be seen in FIG. 3C, all the ball forces, in respect of their effect, correspond to one another as regards their direction, even if not in respect of size, so that a counter force $F_G$ for against the sum of the ball forces acting on the cage has to be applied by the outer joint part to the cage. In accordance with the invention, such a counter force $F_G$ occurs only if the service life angle $2\beta_{SL}$ is exceeded, while inside the service life angle $2\beta_{SL}$ the cage remains axially balanced.

In FIG. 4, similar features have been given the same reference numerals, and modified features have been further indexed by 100. FIG. 4, in greater detail, shows a possible course which can be taken by the track center lines $L_{18}$, $L_{19}$ of the outer joint part 212 and of the inner joint part 215 for the inventive ball tracks 218, 219 according to a first embodiment. The inventive ball tracks whose course is represented by track center lines $L_{18}$, $L_{19}$ are S-shaped, and the figure also shows the position of the turning point $T_{1\text{-}2}$ which, starting from a radius $R_2$ (outer joint part) and, respectively, $R_{2'}$ (inner joint part) is laid around an offset point $O_2$ and $O_2$ respectively, is positioned at an angle $\alpha$ relative to a radial plane, i.e. a plane extending parallel to the central joint plane E. Beyond the turning point $T_{1\text{-}2}$, the track center line continues in a radius $R_1$ (outer joint part), and respectively, $R_{1'}$ itself. In accordance with the invention, the turning point $T_{1\text{-}2}$ as well as the turning point $T_{1\text{-}2'}$ are positioned outside the angle sector of the angle $\beta_{SL}$ as viewed on each side of the central joint plane E. As the reversal of the direction of the angle $\delta_1$, upon the turning point $T_{1\text{-}2}$ being exceeded, takes place in the first pairs of tracks, the requirement as specified here ensures that, in the service life range (articulation of $A_{22}$ relative to $A_{12}$<=$2\beta_{SL}$ on both sides each) no axial forces occur at the cage, but that the cage is kept free from axial forces in the outer joint part. The angle which is defined between the central joint plane E and the line through the joint center 11 and the turning point $T_{1\text{-}2}$ is described as center angle β.

Whereas the service life angle $\beta_{SL}$ and the center angle β are referred to the joint center M—i.e. it start from the longitudinal axis $A_{12}$ and the central plane E respectively and, in this way, describe the position of a ball on the track center line $L_{18}$, $L_{19}$—the center of the angle α at the tangent at the track center line in the turning point $T_{1\text{-}2}$ features an offset $O_2$ and $O_{2'}$ respectively relative to the joint center M.

FIG. 5 shows the relationship between the center angle β with reference to the travel of the ball along the track center line $L_{18}$ in the outer joint part 212 relative to the turning point angle α, with the $$\alpha \geq \beta + \arcsin\left[\frac{O_2}{R_2} - \sin(\beta + 90°)\right]$$

being applicable.

FIG. 6, with reference to an outer joint part 212 according to FIG. 5, shows the influence of the turning point angle α on the track enveloping angle ϵ in the outer joint part. The track enveloping angle ϵ is defined as the angle between a radial plane R and a ray through the ball center and, respectively, the track center line $L_{18}$ at a track edge. When the track enveloping angle ϵ becomes small, there occur disadvantageous edge loads in the tracks 218, which edge loads can lead to damage. The torque transmitting capacity is thus limited. Up to a turning point angle α of 16° the track enveloping angle ϵ is still sufficiently large.

FIG. 7 shows the relationship between the service life angle β with reference to the travel of the ball in the track and the turning point angle α for a second possible embodiment of an inventive outer joint part 312. This figures shows the first outer ball track 318 and second outer ball track 320. In the region around the central joint plane E, the center line $L_{18}$ of the ball track 318 comprises an arch having a smaller radius $R_2$ with a center $M_2$ which, relative to the joint center M, is offset by an axial offset $O_2$ and by a radial offset a. The tangent at the turning point $T_{1\text{-}2}$ is defined via said angle. From the turning point, the track center line continues with an arch having a radius $R_1$ around a center $M_1$ which is determined by the value of $R_1$ and by the value of the angle α.

Between the service life angle β centered around the joint center M and the turning point angle α, there applies the equation:

$$\alpha \geq \beta + \arcsin\left[\frac{O_2 + a \cdot \tan(\beta)}{R_2} - \sin(\beta + 90°)\right]$$

FIG. 8 shows the relationship between the service life angle β with reference to the travel of the ball in the track and the turning point angle α for a second possible embodiment of an inventive outer joint part 412. This figure shows the first outer ball track 418 and second outer ball track 420. In the region around the central joint plane E, the center line $L_{18}$ of the ball track 418 comprises an arch having a smaller radius $R_2$ with a center $M_2$ which, relative to the joint center M, is offset by an axial offset $O_2$ and by a radial offset b. The tangent at the turning point $T_{1-2}$ is defined via said angle. From the turning point, the track center line continues with an arch having a radius $R_1$ around a center $M_1$ which is determined by the value of $R_1$ and by the value of the angle α. Between the service life angle β entered around the joint center M and the turning point angle α, there applies the equation:

$$\alpha \geq \beta + \arcsin\left[\frac{O_2 - b \cdot \tan(\beta)}{R_2} - \sin(\beta + 90°)\right]$$

FIG. 9 shows an inventive 6-ball joint 511 wherein the center lines $L_{18}$ of the outer ball tracks 518 comprise three arches having the radii $R_1$, $R_2$, $R_3$, with the arches of the radii $R_1$, $R_2$ adjoining one another via a turning point, whereas the center lines $L_{20}$ of the second outer ball tracks 520 are defined by an arch having a radius $R_5$ with an adjoining axis-parallel straight line. As compared to FIG. 1, further modified features have been indexed by 500.

FIG. 10 shows an inventive 6-ball joint 611 wherein the center lines $L_{18}$ of the outer ball tracks 518 comprise three arches having radii $R_1$, $R_2$, $R_3$, with the arches of the radii $R_1$, $R_2$ adjoining one another via a turning point, whereas the center lines $L_{20}$ of the second outer ball tracks 620 are defined by two arches with the radii $R_4$, $R_5$ which adjoin one another via a turning point. As compared to FIG. 9, modified features are indexed by 600.

FIG. 11 shows an inventive 6-ball joint wherein the center lines $L_{18}$ of the outer ball tracks 518 comprise three arches having the radii $R_1$, $R_2$, $R_3$, with the arches of the radii $R_1$, $R_2$ adjoining one another via a turning point, whereas the center lines $L_{20}$ of the second outer ball tracks 720 are defined by an arch having a radius $R_5$. The second tracks are thus of the same type as the tracks of RF joints. As compared to FIG. 9, modified features are indexed by 700.

FIG. 12 shows an inventive 6-ball joint wherein the center lines $L_{18}$ of the outer ball tracks 818 comprise two arches having the radii $R_2$, $R_3$ and a straight line tangentially adjoining the radius $R_2$ in the direction towards the aperture, whereas the center lines $L_{20}$ of the second outer ball tracks 720 are defined by an arch with a radius $R_5$. As compared to FIG. 11, modified features have been indexed by 800.

FIG. 13 shows an inventive 8-ball joint wherein the center lines $L_{18}$ of the outer ball tracks 918 comprise three arches having the radii $R_1$, $R_2$, $R_3$, wherein the arches of the radii $R_1$, $R_2$ adjoin one another via a turning point, whereas the center lines $L_{20}$ of the second outer ball tracks 920 are defined by an arch having a radius $R_5$ with an adjoining axis-parallel straight line. As compared to the proceeding figures, modified components have been indexed by 900.

FIG. 14 shows an inventive 8-ball joint wherein the center lines $L_{18}$ of the outer ball tracks 918 comprise three arches having the radii $R_1$, $R_2$, $R_3$, wherein the arches having the radii $R_1$, $R_2$ adjoin one another via a turning point, whereas the center lines $L_{20}$ of the second outer ball tracks 1020 are defined by two arches having the radii $R_4$, $R_5$ which adjoin one another via a turning point. As compared to FIG. 13, modified features have been indexed by 1000.

FIG. 15 shows an inventive 8-ball joint wherein the center lines $L_{18}$ of the outer ball tracks 918 comprise three arches having the radii $R_1$, $R_2$, $R_3$, wherein the arches of the radii $R_1$, $R_2$ adjoin one another via a turning point, whereas the center lines $L_{20}$ of the second outer ball tracks 1120 are defined by an arch with a radius $R_5$. The second tracks are thus of the same type as the tracks of RF joints. As compared to FIG. 13, modified features have been indexed by 1100.

FIG. 16 shows an inventive 8-ball joint wherein the center lines of the outer ball tracks 1218 comprise two arches having the radii $R_2$, $R_3$ and a straight line tangentially adjoining the arch having the radius $R_2$ in the direction towards the aperture, whereas the center lines $L_{20}$ of the second outer ball tracks 1120 are cdefined by an arch having a radius $R_5$. As compared to FIGS. 13-15, modified features have been indexed by 1200.

FIG. 17 shows in detail the shape of the first outer ball tracks 18 and of the first inner ball tracks 19 for a 6-ball counter track joint according to FIG. 1, with the center line $L_{18}$ of the first outer ball track 18 being comprising two arches with the radii $R_1$, $R_2$, as already described above, and with the center line $L_{19}$ of the inner ball track 19 comprising two arches with the radii $R_{1'}$, $R_{2'}$ which are symmetrical relative to the joint center M. In addition, the Figure shows, in the form of a table, the relationship between the turning point angle α and the track enveloping angle ε for the track 18 in the outer joint part and the track enveloping angle ε' for the track 19 in the inner joint part. This shows that it is necessary for α>=10° and <=18° to be able to ensure satisfactory enveloping angles ε, ε'.

FIG. 18 shows an inventive 8-ball joint which corresponds to that shown in FIG. 13, with the ball cage 916 additionally being shown in the form of a detail in the cross-sectional view. Furthermore, it can be seen that the cage windows 913 for the first balls $\mathbf{17}_1$ comprise a shorter circumferential length $L_1$ than the cage windows 924 for the second balls $\mathbf{17}_2$ which comprise a longer circumferential length $L_2$. The outer ball cage diameter cage has been given the reference symbol DCA and the inner cage diameter the reference symbol DCI, in both cases with reference to the central plane E in which the ball cage 916 is shown in section. The circumferential width of the cage webs, on the outside, has been given the reference symbol W. The pitch circle diameter of the balls in the joint is referred to as PCDB, whereas the insertion aperture for the shaft in the inner joint part comprises a diameter PDCS. In case the connection between the inner joint part and the shaft (not shown) is produced via shaft teeth, said diameter PCDS equals the mean teeth diameter of the shaft teeth in the inner joint part.

FIG. 19, which refers to an 8-ball joint, shows the track center lines at the outer joint part 1012 and at the inner joint part 1015 separately. The first outer tracks 918 comprise the three above-mentioned arches with the radii $R_1$, $R_2$, $R_3$, whereas the track center line of the first inner ball track 919 comprises three identically sized arched having the radii $R_{1'}$, $R_{2'}$, $R_{3'}$ positioned symmetrically relative thereto. The second outer ball tracks 1020 comprise arches having the radii $R_4$ and $R_5$, whereas the corresponding second inner ball tracks 1021, with reference to the joint center M, comprise arches with the radii $R_{4'}$, $R_{5'}$ arranged symmetrically relative thereto. The greatest outer diameter of the outer joint part is referred to as OD and the axial length of the inner joint part as L.

FIG. 20 shows a driveshaft incorporated as a sideshaft into a motor vehicle. The figure shows an inventive driveshaft comprising an inventive constant velocity joint 11 in the form of a monoblock joint, furthermore an intermediate shaft 35 and a second constant velocity joint 31 which can also be an inventive joint, more particularly designed identically to the joint 11. The intermediate shaft 35 comprises an axial displacement unit 28 which, as major components, comprises a sleeve 29, a journal 30 and torque transmitting balls operating between the sleeve 29 and the journal 30, but which is not shown in greater detail and which permits an adjustment in the length of the driveshaft between the constant velocity joints 11, 31. The shaft journal of the inventive joint 11 has been inserted into a differential drive 32 and is secured therein, whereas the shaft journal of the second fixed joint 31 has been inserted into a wheel hub assembly 33 with a wheel bearing 34.

An inventive counter track joint with 8 balls for an angle of articulation of 47°-52° is optimized if the following relationships are observed between individual measured parameters:

⅕<PCDB/R1<1.9

1.8<PCDB/R2<2.2

2.3<PCDB/R3<2.7

2.1<PCDB/R4<2.5

1.8<PCDB/R5<2.2

12<PCDB/O2<16

12<PCDB/O5<16

0.6<PCDB/OD<0.8

2.1<PCDB/L<2.5

3.4<PCDB/DB<4.0

2.1<PCDB/DS<2.5

0.75<PCDB/DCA<1.05

0.85<PCDB/DCI<1.15

7.5<PCDB/W<11.5

2.8<PCDB/L1<3.4

2.6<PCDB/L2<3.2

In said relationships, the parameters used have the following meaning:

PCDB:pitch circle diameter of balls

R1:outer part ball track radius 1 (first ball tracks)

R2:outer part ball track radius 2 (first ball tracks)

R3:outer part ball track radius 3 (first ball tracks)

R4:outer part ball track radius 4 (second ball tracks)

R5:outer part ball track radius 5 (second ball tracks)

O2:outer part ball track offset for track with opening angle towards attaching end O5:outer part ball track offset for track with opening angle towards aperture end OD:outer diameter outer part L:length inner part DB:ball diameter PCDS:pitch circle diameter of splines DCA:cage outer diameter DCI:cage inner diameter W:cage web width L1:cage window length 1 (first cage windows)

L2:cage window length 2 (second cage windows).

The invention claimed is:

1. A constant velocity joint in the form of a counter track joint comprising:

an outer joint part comprising a first longitudinal axis ($A_{12}$) and an attaching end and an aperture end which are axially opposed relative to one another, and first outer ball tracks and second outer ball tracks;

an inner joint part comprising a second longitudinal axis ($A_{22}$) and an attaching mechanism for a shaft pointing to the aperture end of the outer joint part, and first inner ball tracks and second inner ball tracks, the first outer ball tracks and the first inner ball tracks form first pairs of tracks with one another, and the second outer ball tracks and the second inner ball tracks form second pairs of tracks with one another, the pairs of tracks each accommodate a torque transmitting ball; and a ball cage positioned between the outer joint part and the inner joint part and comprising circumferentially distributed cage windows which each accommodate at least one of the balls;

wherein, when the joint is in the aligned condition, an aperture angle ($\delta_1$) of the first pairs of tracks opens in a central joint plane (E) form the aperture end to the attaching end of the outer joint part;

wherein, when the joint is in the aligned condition, an aperture angle ($\delta_2$) of the second pairs of tracks opens in the central joint plane (E) from the attaching end to the aperture end of the outer joint part, wherein central track lines ($L_{18}$, $L_{19}$) of the first pairs of tracks each have a curvature with a radius ($R_2$) around a center point ($M_2$), said center point ($M_2$) being in an offset plane extending parallel to the central joint plane (E) and having an axial distance ($O_2$) therefrom;

wherein, furthermore, said central track lines ($L_{18}$, $L_{19}$) each have a turning point ($T_{1-2}$), said turning point ($T_{1-2}$) forming a transition from said curvature with radius ($R_2$) into a counter-curvature or into a straight line;

wherein, a center angle ($\beta$) being defined between said central joint plane (E) and a line through said joint center M and said turning point ($T_{1-2}$), said center angle ($\beta$) being greater than 4°; and wherein, a turning point angle ($\alpha$) being defined between said offset plane and a line through said center point ($M_2$) and said turning point ($T_{1-2}$), said turning point angle ($\alpha$) being within a range of $10° \leqq \alpha \leqq 18°$.

2. A constant velocity joint according to claim 1, wherein the center angle ($\beta$) from the joint center M to the turning point ($T_{1-2}$), with reference to the central joint plane (E), is greater than 5°.

3. A joint according to claim 1, wherein the center angle ($\beta$) from the joint center M to the turning point ($T_{1-2}$), with reference to the central joint plane (E), is less than 12°.

4. A constant velocity joint according to claim 1, wherein the turning point angle ($\alpha$) is defined by $$\alpha \geqq \beta + \arcsin[O_2/R_2 - \sin(\beta + 90°)].$$

5. A constant velocity joint according to claim 1, wherein the turning point angle ($\alpha$) is defined by:

$$\alpha \geqq \beta + \arcsin[O_2 + \alpha \cdot \tan(\beta)/R_2 - \sin(\beta + 90°)]$$

when the center point ($M_2$) of said radius ($R_2$) comprises a radial distance (a) from the respective longitudinal axis ($A_{12}$, $A_{22}$) towards the turning point ($T_{1-2}$).

6. A constant velocity joint according to claim 1, wherein the turning point angle ($\alpha$) is defined by:

$$\alpha \geqq \beta + \arcsin[O_2 - b \cdot \tan(\beta)/R_2 - \sin(\beta + 90°)]$$

when the center point ($M_2$) of said radius $R_2$ comprises a radial distance (b) from the respective longitudinal axis ($A_{12}$, $A_{22}$) towards the turning point ($T_{1-2}$).

7. A constant velocity joint according to claim 1, wherein the central track lines ($L_{18}$, $L_{19}$) comprise said radius ($R_2$) and, as from the turning point ($T_{1-2}$), a counter radius ($R_1$).

8. A constant velocity joint according to claim 1, wherein the central track lines ($L_{18}$, $L_{19}$) comprise said first radius ($R_2$) and, as from the turning point ($T_{1-2}$), a counter radius ($R_1$) as well as a smaller radius ($R_3$) which smaller radius ($R_3$) adjoins the first radius ($R_2$) on the opposite side and has the same sense of curvature.

9. A constant velocity joint according to claim 1, wherein the central track lines ($L_{18}$, $L_{19}$) comprise said first radius ($R_2$), a straight line following the first radius ($R_2$) from the turning point ($T_{1-2}$) on, and a smaller radius ($R_3$), which smaller radius ($R_3$) adjoins the first radius ($R_2$) on the opposite side and has the same sense of curvature.

10. A constant velocity joint according to claim 1, wherein central track lines ($L_{20}$, $L_{21}$) of the second ball tracks comprise a radius ($R_5$) and an axis-parallel straight line which follows the radius ($R_5$) towards the aperture end.

11. A constant velocity joint according to claim 1, wherein central track lines ($L_{20}$, $L_{21}$) of the second ball tracks comprise a radius ($R_5$) and a counter radius ($R_4$) which follows towards the aperture end.

12. A constant velocity joint according to claim 1, wherein the central track lines ($L_{20}$, $L_{21}$) of the second ball tracks are formed of a single radius ($R_5$).

13. A constant velocity joint according to claim 1, wherein the joint is 6-ball joint.

14. A constant velocity joint according to claim 1, wherein the joint is 8-ball joint.

15. A constant velocity joint according to claim 1, wherein the cage windows for the first balls are shorter in the circumferential direction than the cage windows for the second balls.

16. A driveshaft comprising two constant velocity joints and an intermediate shaft, wherein at least one of the constant velocity joints is a constant velocity joint according to claim 1.

17. A driveshaft according to claim 6, wherein the intermediate shaft comprises an axial plunging unit.

18. A motor vehicle having at least two driveshafts which each comprise two constant velocity joints and an intermediate shaft and which each, in the form of sideshafts, connect a differential drive with a wheel hub unit, wherein at least one of the joints of each driveshaft is a joint according to claim 1 and wherein a shaft journal of same is inserted into the differential drive.

19. A motor vehicle having at least two driveshafts which each comprise two constant velocity joints and an intermediate shaft and which each, in the form of sideshafts, connected a differential drive with a wheel hub unit, wherein at least one of the joints of each driveshaft is a joint according to claim 1 and wherein a shaft journal of same is inserted into the wheel hub unit.

* * * * *

UNITED STATES PATENT AND TRADEMARK OFFICE

CERTIFICATE OF CORRECTION

PATENT NO. : 7,396,285 B2
APPLICATION NO. : 10/562962
DATED : July 8, 2008
INVENTOR(S) : Thomas Weckerling It is certified that error appears in the above-identified patent and that said Letters Patent is hereby corrected as shown below:

In Claim:

In Claim 1, column 12, line 34, please change “form” to “from”

Signed and Sealed this

Tenth Day of March, 2009

JOHN DOLL
*Acting Director of the United States Patent and Trademark Office*

UNITED STATES PATENT AND TRADEMARK OFFICE

CERTIFICATE OF CORRECTION

PATENT NO. : 7,396,285 B2
APPLICATION NO. : 10/562962
DATED : July 8, 2008
INVENTOR(S) : Thomas Weckerling It is certified that error appears in the above-identified patent and that said Letters Patent is hereby corrected as shown below:

In the Claims:

In Claim 5, column 13, please change:

--$\alpha \geq \beta + \arcsin[O_2 + \alpha \cdot \tan(\beta)/R_2 - \sin(\beta + 90°)]$-- to read:

"$\alpha \geq \beta + \arcsin[[O_2 + a \cdot \tan(\beta)]/R_2 - \sin(\beta + 90°)]$"

In Claim 6, column 13, please change:

--$\alpha \geq \beta + \arcsin[O_2 - b \cdot \tan(\beta)/R_2 - \sin(\beta + 90°)]$-- to read:

"$\alpha \geq \beta + \arcsin[[O_2 - b \cdot \tan(\beta)]/R_2 - \sin(\beta + 90°)]$"

In Claim 17, column 14, please change --claim 6-- to "claim 16"

Signed and Sealed this

First Day of September, 2009

David J. Kappos
*Director of the United States Patent and Trademark Office*

UNITED STATES PATENT AND TRADEMARK OFFICE

CERTIFICATE OF CORRECTION

PATENT NO. : 7,396,285 B2
APPLICATION NO. : 10/562962
DATED : July 8, 2008
INVENTOR(S) : Thomas Weckerling It is certified that error appears in the above-identified patent and that said Letters Patent is hereby corrected as shown below:

In the Claims:

In Claim 5, column 13, line 3, please change:

--$\alpha \geq \beta + \arcsin[O_2 + \alpha \cdot \tan(\beta)/R_2 - \sin(\beta + 90°)]$-- to read:

"$\alpha \geq \beta + \arcsin[[O_2 + a \cdot \tan(\beta)]/R_2 - \sin(\beta + 90°)]$"

In Claim 6, column 13, line 11, please change:

--$\alpha \geq \beta + \arcsin[O_2 - b \cdot \tan(\beta)/R_2 - \sin(\beta + 90°)]$-- to read:

"$\alpha \geq \beta + \arcsin[[O_2 - b \cdot \tan(\beta)]/R_2 - \sin(\beta + 90°)]$"

In Claim 17, column 14, line 19, please change --claim 6-- to "claim 16"

This certificate supersedes the Certificate of Correction issued September 1, 2009.

Signed and Sealed this

Twenty-second Day of September, 2009

David J. Kappos

David J. Kappos
*Director of the United States Patent and Trademark Office*